(12) United States Patent
Horn et al.

(10) Patent No.: US 11,646,788 B2
(45) Date of Patent: May 9, 2023

(54) LOCATION ACCURACY SIGNALING FOR MOVABLE RELAY NODES

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/412,594

(22) Filed: Aug. 26, 2021

(65) Prior Publication Data

US 2023/0063285 A1    Mar. 2, 2023

(51) Int. Cl.
| | |
|---|---|
| H04L 5/12 | (2006.01) |
| H04B 7/185 | (2006.01) |
| H04B 17/26 | (2015.01) |
| H04B 7/06 | (2006.01) |
| H04W 24/10 | (2009.01) |
| H04B 17/318 | (2015.01) |

(52) U.S. Cl.
CPC ....... *H04B 7/18504* (2013.01); *H04B 7/0639* (2013.01); *H04B 7/18506* (2013.01); *H04B 17/26* (2015.01); *H04B 17/318* (2015.01); *H04W 24/10* (2013.01)

(58) Field of Classification Search
CPC .............. H04B 7/18504; H04B 7/0639; H04B 7/18506; H04B 17/26; H04B 17/318; H04W 24/10
USPC ......................................................... 375/262
See application file for complete search history.

(56) References Cited

U.S. PATENT DOCUMENTS

| | | | | |
|---|---|---|---|---|
| 10,999,855 B1 * | 5/2021 | Singh | ..................... | H04W 76/10 |
| 2022/0271977 A1 * | 8/2022 | Landis | .................. | H04W 76/27 |

* cited by examiner

*Primary Examiner* — Helene E Tayong
(74) *Attorney, Agent, or Firm* — Holland & Hart LLP

(57) ABSTRACT

Methods, systems, and devices for wireless communications are described, including a movable relay location variance report. The movable relay location variance report may enable more robust and accurate communications between a control node (e.g., a user equipment (UE) and a base station) and a movable relay (e.g., a drone) equipped with a reconfigurable intelligent surface (RIS). In some aspects, the location variance report may characterize the variance of the drone's location and transmit the information to the UE, the base station, or both. The location variance report may influence the control node beam width, the drone location, and an angle at which the drone may position a RIS. The control node may indicate an adjusted set of parameters to the drone based on receiving the location variance report.

30 Claims, 15 Drawing Sheets

LOCATION ACCURACY SIGNALING FOR MOVABLE RELAY NODES

FIELD OF TECHNOLOGY

The following relates to wireless communications, including location accuracy signaling for movable relay nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, wireless communications devices may use a line of sight (LOS) channel to communicate with each other. However, wireless communications devices, may encounter one or more challenges associated with one or more operating frequencies. In some examples, blockage or interference may reduce a strength of a signal between the wireless communication devices using the LOS channel, which may reduce the likelihood of successful communications between the wireless communications devices.

SUMMARY

The described techniques relate to improved methods, systems, devices, and apparatuses that support location accuracy signaling for movable relay nodes. Generally, the described techniques provide for informing one or more wireless devices of a location variance corresponding to a movable relay node (e.g., drone, vehicle). Specifically, techniques allowing a movable relay node (e.g., equipped with a reconfigurable intelligent surface (RIS)) to notify one or more wireless devices in communication with the moving relay node of one or more varying aspects of the drone's location (e.g., spatial location, pitch, yaw, roll). The movable relay node may transmit, to one or more wireless devices, a moving relay node location variance report which may enable more robust and accurate communications between a control node (e.g., a user equipment (UE) and a base station) and the movable relay node. The location variance report may be an accuracy report, where the accuracy report may characterize one or more variations associated with the movable relay node.

In some cases, the movable relay node may indicate a large spatial location variance via the location variance report (e.g., due to wind). Based on the variance indicated by the movable relay node, the control node may alter one or more beam parameters, or instruct the movable relay node to perform one or more maneuvers, or both. For example, the location variance report may influence the beam width at the control node, the movable relay node, or both, a location of the movable relay node, or an angle at which the movable relay node may position a reconfigurable intelligent surface (RIS) (e.g., via altering roll, pitch, yaw, or a combination thereof, associated with the moving relay). The control node may indicate an adjusted set of parameters to the drone based on receiving the location variance report. By communicating location variance via the location variance report, a UE, a base station, or both, may issue one or more instructions to compensate for the location variance, which may improve network throughput (e.g., due to increasing a reception area on the RIS), network reliability (e.g., by the moving relay repositioning such that location variance is reduced), and improve latency (e.g., by altering one or more beam parameters such that a larger beam cross-section is incident on both the RIS and the receiving device).

A method for wireless communications at a control node is described. The method may include establishing a connection with a movable relay node positioned at a first location, receiving, from the movable relay node and based on establishing the connection, a message indicating a location variance for the movable relay node at the first location, and adjusting a set of operational parameters for the movable relay node based on receiving the message indicating the location variance for the movable relay node.

An apparatus for wireless communications at a control node is described. The apparatus may include a processor, memory coupled with the processor, and instructions stored in the memory. The instructions may be executable by the processor to cause the apparatus to establish a connection with a movable relay node positioned at a first location, receive, from the movable relay node and based on establishing the connection, a message indicating a location variance for the movable relay node at the first location, and adjust a set of operational parameters for the movable relay node based on receiving the message indicating the location variance for the movable relay node.

Another apparatus for wireless communications at a control node is described. The apparatus may include means for establishing a connection with a movable relay node positioned at a first location, means for receiving, from the movable relay node and based on establishing the connection, a message indicating a location variance for the movable relay node at the first location, and means for adjusting a set of operational parameters for the movable relay node based on receiving the message indicating the location variance for the movable relay node.

A non-transitory computer-readable medium storing code for wireless communications at a control node is described. The code may include instructions executable by a processor to establish a connection with a movable relay node positioned at a first location, receive, from the movable relay node and based on establishing the connection, a message indicating a location variance for the movable relay node at the first location, and adjust a set of operational parameters for the movable relay node based on receiving the message indicating the location variance for the movable relay node.

In some examples of the method, apparatuses, and non-transitory computer-readable medium described herein, receiving the message may include operations, features, means, or instructions for receiving a request for the movable relay node to move to a second location based on determining that the location variance for the movable relay node at the first location may be greater than a threshold.

Some examples of the method, apparatuses, and non-transitory computer-readable medium described herein may further include operations, features, means, or instructions for transmitting, to the movable relay node at the first location and based on receiving the request, a location message indicating the second location for the movable relay node, where adjusting the set of operational parameters may be based on transmitting the location message.

In some examples of the method, apparatuses, and non-transitory computer-readable medium described herein, receiving the message may include operations, features, means, or instructions for receiving a request indicating a beam width for a beam used to communicate with the movable relay node, where adjusting the set of operational parameters may be based on receiving the request indicating the beam width.

Some examples of the method, apparatuses, and non-transitory computer-readable medium described herein may further include operations, features, means, or instructions for transmitting, to the movable relay node at the first location and based on receiving the request of the beam width, an indication of a selected beam width for communicating with the movable relay node, where adjusting the set of operational parameters includes adjusting a current beam width for the beam used to communicate with the movable relay node to the selected beam width.

In some examples of the method, apparatuses, and non-transitory computer-readable medium described herein, receiving the message may include operations, features, means, or instructions for receiving a request for a second beam width wider than a first beam width by a factor, where the location variance for the movable relay node may be determined based on the first beam width.

Some examples of the method, apparatuses, and non-transitory computer-readable medium described herein may further include operations, features, means, or instructions for transmitting, to the movable relay node at the first location and based on receiving the message indicating the location variance, an indication of a distance between the movable relay node and a second node, where adjusting the set of operational parameters may be based on transmitting the indication of the distance.

In some examples of the method, apparatuses, and non-transitory computer-readable medium described herein, the control node includes a user equipment (UE) and the second node includes a base station.

Some examples of the method, apparatuses, and non-transitory computer-readable medium described herein may further include operations, features, means, or instructions for transmitting, to the movable relay node at the first location and based on receiving the message indicating the location variance, an indication of a second value associated with a reconfigurable intelligent surface plane angle for the movable relay node, where adjusting the set of operational parameters may be based on transmitting the indication of the second value.

In some examples of the method, apparatuses, and non-transitory computer-readable medium described herein, receiving the message may include operations, features, means, or instructions for receiving a physical downlink shared channel including the message indicating the location variance for the movable relay node, where the message includes a radio resource control message, a medium access control (MAC) control element, or both.

In some examples of the method, apparatuses, and non-transitory computer-readable medium described herein, receiving the message may include operations, features, means, or instructions for receiving a physical sidelink shared channel including the message indicating the location variance for the movable relay node.

In some examples of the method, apparatuses, and non-transitory computer-readable medium described herein, the message includes a periodic message or an aperiodic message.

In some examples of the method, apparatuses, and non-transitory computer-readable medium described herein, the location variance may be in accordance with an axis of the movable relay node, or a geographic coordinate system, or both.

In some examples of the method, apparatuses, and non-transitory computer-readable medium described herein, the control node includes a UE or a base station or both.

In some examples of the method, apparatuses, and non-transitory computer-readable medium described herein, the control node includes a base station and a second node includes a UE.

A method for wireless communications at a movable relay node is described. The method may include establishing a connection with a control node, where the movable relay node is positioned at a first location, transmitting, to the control node and based on establishing the connection, a message indicating a location variance for the movable relay node at the first location, and receiving, from the control node, an indication of an adjusted set of operational parameters for the movable relay node based on transmitting the message indicating the location variance for the movable relay node.

An apparatus for wireless communications at a movable relay node is described. The apparatus may include a processor, memory coupled with the processor, and instructions stored in the memory. The instructions may be executable by the processor to cause the apparatus to establish a connection with a control node, where the movable relay node is positioned at a first location, transmit, to the control node and based on establishing the connection, a message indicating a location variance for the movable relay node at the first location, and receive, from the control node, an indication of an adjusted set of operational parameters for the movable relay node based on transmitting the message indicating the location variance for the movable relay node.

Another apparatus for wireless communications at a movable relay node is described. The apparatus may include means for establishing a connection with a control node, where the movable relay node is positioned at a first location, means for transmitting, to the control node and based on establishing the connection, a message indicating a location variance for the movable relay node at the first location, and means for receiving, from the control node, an indication of an adjusted set of operational parameters for the movable relay node based on transmitting the message indicating the location variance for the movable relay node.

A non-transitory computer-readable medium storing code for wireless communications at a movable relay node is described. The code may include instructions executable by a processor to establish a connection with a control node, where the movable relay node is positioned at a first location, transmit, to the control node and based on establishing the connection, a message indicating a location variance for the movable relay node at the first location, and receive, from the control node, an indication of an adjusted set of operational parameters for the movable relay node based on transmitting the message indicating the location variance for the movable relay node.

Some examples of the method, apparatuses, and non-transitory computer-readable medium described herein may further include operations, features, means, or instructions for determining that the location variance for the movable relay node at the first location may be greater than a threshold, where transmitting the message includes transmitting a request for the movable relay node to move to a second location based on determining that the location variance for the movable relay node at the first location may be greater than the threshold.

Some examples of the method, apparatuses, and non-transitory computer-readable medium described herein may further include operations, features, means, or instructions for receiving, from the control node and based on transmitting the request, a location message indicating the second location for the movable relay node, where the adjusted set of operational parameters may be adjusted based on the location message.

In some examples of the method, apparatuses, and non-transitory computer-readable medium described herein, transmitting the message may include operations, features, means, or instructions for transmitting a request indicating a beam width for a beam used to communicate with the movable relay node.

Some examples of the method, apparatuses, and non-transitory computer-readable medium described herein may further include operations, features, means, or instructions for receiving, from the control node and based on transmitting the request of the beam width, an indication of a selected beam width for communicating with the movable relay node, where the adjusted set of operational parameters includes adjusting a current beam width for the beam used to communicate with the movable relay node to the selected beam width.

Some examples of the method, apparatuses, and non-transitory computer-readable medium described herein may further include operations, features, means, or instructions for determining the location variance for the movable relay node may be determined based on a first beam width, where transmitting the message includes transmitting a request for a second beam width wider than the first beam width by a factor.

Some examples of the method, apparatuses, and non-transitory computer-readable medium described herein may further include operations, features, means, or instructions for receiving, from the control node and based on transmitting the message indicating the location variance, an indication of a distance between the movable relay node and a second node, where the adjusted set of operational parameters may be based on the indication of the distance.

In some examples of the method, apparatuses, and non-transitory computer-readable medium described herein, the control node includes a UE and the second node includes a base station.

Some examples of the method, apparatuses, and non-transitory computer-readable medium described herein may further include operations, features, means, or instructions for receiving, from the control node and based on transmitting the message indicating the location variance, an indication of a second value associated with a reconfigurable intelligent surface plane angle for the movable relay node, where the adjusted set of operational parameters may be based on the indication of the second value.

In some examples of the method, apparatuses, and non-transitory computer-readable medium described herein, transmitting the message may include operations, features, means, or instructions for transmitting a physical downlink shared channel including the message indicating the location variance for the movable relay node, where the message includes a radio resource control message, a medium access control (MAC) control element, or both.

In some examples of the method, apparatuses, and non-transitory computer-readable medium described herein, transmitting the message may include operations, features, means, or instructions for transmitting a physical sidelink shared channel including the message indicating the location variance for the movable relay node.

In some examples of the method, apparatuses, and non-transitory computer-readable medium described herein, the location variance may be in accordance with an axis of the movable relay node, or a geographic coordinate system, or both.

DETAILED DESCRIPTION

Figure 1:
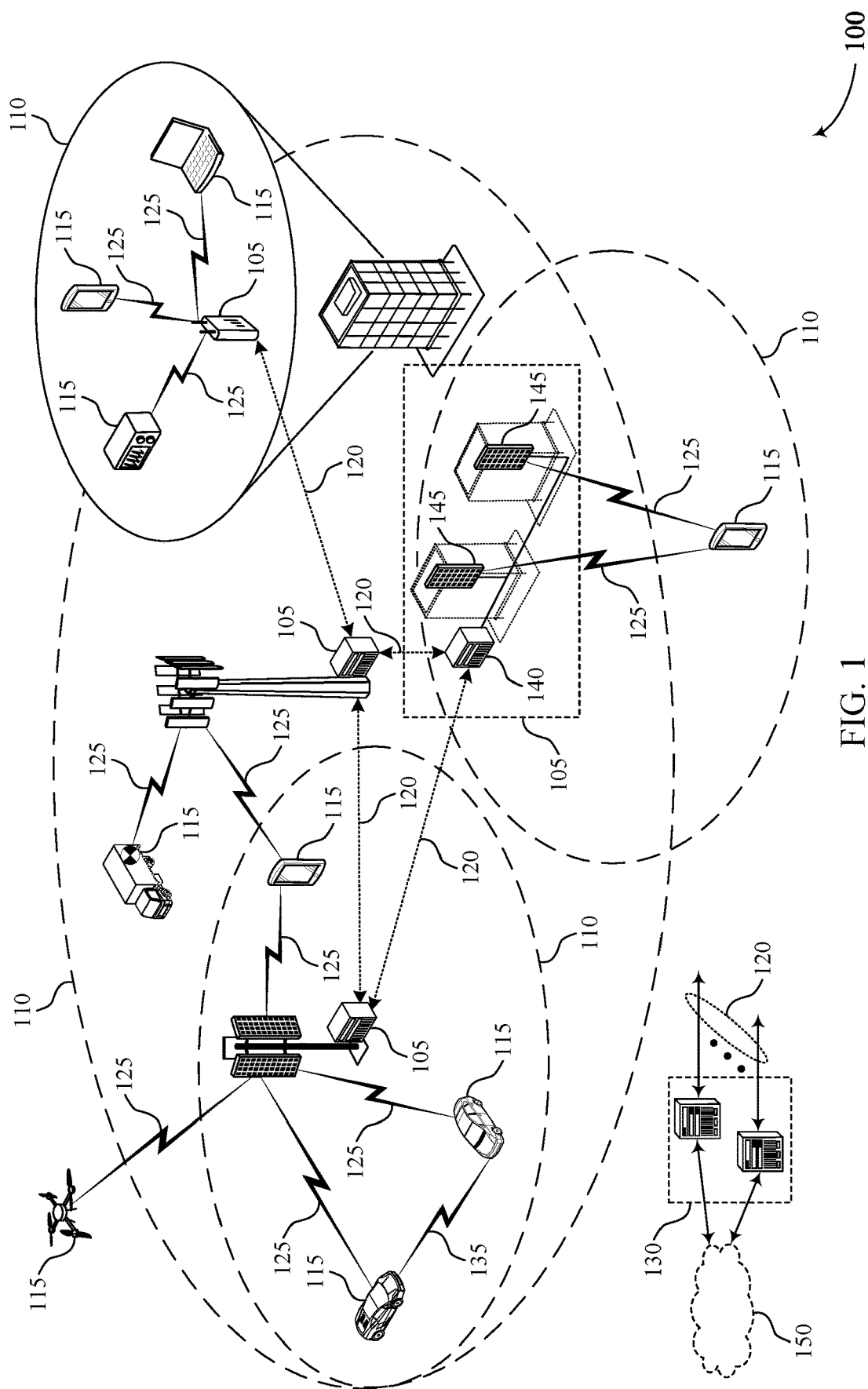
FIG. 1 illustrates an example of a wireless communications system that supports location accuracy signaling for movable relay nodes in accordance with aspects of the present disclosure.

In some wireless communication systems, communications devices may utilize higher frequency bands for higher throughput and lower latency. utilize higher frequency bands for higher throughput and lower latency. Communication devices operating in higher frequency bands may have a higher likelihood of successful communications when there is a line of sight (LOS) channel between the communication devices. In some wireless communication systems, such as fifth generation (5G) New Radio (NR), wireless devices may utilize beamforming techniques to perform high throughput and low latency communications at higher frequencies, such as millimeter-wave (mmW) communications. For example, while higher frequencies, such as frequencies within frequency range 2 (FR2) and above, may experience increased free space path loss and atmospheric attenuation as a carrier frequency is increased, the wireless communications system may leverage line-of-sight (LOS) communications for robust communications with high data throughputs. In some examples, non-line-of-sight (NLOS) communications in FR2 may result in attenuation and reduced signal strength, especially in dense environments, which may reduce the likelihood of successful communications between the communication devices.

One or more techniques to assist a wireless communications system operating in FR2 or higher frequencies may be to place a movable relay node (e.g., a flying element or a drone) that can supply LOS communications to one or more devices in the wireless communications system. For example, the movable relay node may be an example of a drone, vehicle, robot, or any other option as long as the movable relay node can change location and (in some cases) pose (e.g., a specified pitch, roll, and yaw) dynamically. A network operator may use movable relay nodes (e.g., drones) equipped with reconfigurable intelligent surfaces (RISs) to provide dynamic LOS channels for wireless devices operating in higher frequency bands. For example, a first wireless device (e.g., a UE or a base station) may configure a movable relay node to relay (e.g., reflect) communications between the first wireless device and a second wireless device (e.g., a UE or a base station). Configuring the movable relay node to relay communications between the first wireless device and the second wireless device may improve the likelihood of successful communications between the first wireless device and the second wireless device, and may also result in greater cell coverage, higher throughput levels, and improved communication reliability, among other benefits.

In some cases, the UE may not know the accuracy with which the drone is capable of staying in a location determined or indicated by the UE, base station, or both. For example, if the movable relay node is drone, weather or wind may impact the movable relay node's ability to stay at a location for a duration of time. A variance corresponding to the location of the drone may influence the drone's ability (e.g., efficiency) to receive and reflect beamformed transmissions from the UE and the base station. Aspects of the present disclosure provide for leveraging a location variance that may enable more robust and accurate UE to moving relay to base station communications (e.g., and vice versa), which may improve overall information throughput and coverage in diverse environments. The location variance report may be an accuracy report, where the location variance report may characterize the variance of the drone's location (e.g., per axis) and transmit the information to the UE via sidelink or physical downlink shared channel (PDSCH), to the base station, or both.

In some examples, the location variance report may influence a beam width between a control node and the movable relay node, a location corresponding to the movable relay node, or an angle at which the drone may position a RIS (e.g., pitch, roll, and yaw of the RIS). The control node may indicate an adjusted set of parameters to the movable relay node based on receiving the location variance report. By communicating location variance via the location variance report, the control node may issue one or more instructions to compensate for the location variance, which may improve network throughput (e.g., due to increasing a reception area on the RIS), network reliability (e.g., by the moving relay repositioning such that location variance is reduced), and improve latency (e.g., by altering one or more beam parameters such that a larger beam cross-section is incident on both the RIS and the receiving device).

Aspects of the present disclosure may be implemented to realize one or more of the following advantages. The described techniques may provide for greater cell coverage, higher throughput levels, and improved communication reliability in higher frequency bands. For example, the described techniques may enable a first wireless device to communicate with a second wireless device via a movable relay node when there is no direct communication link between the first wireless device and the second wireless device. As such, an accuracy report transmitted by the movable relay node may improve the likelihood of successful communications between the first wireless device and the second wireless device, among other benefits.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to location accuracy signaling for movable relay nodes.

FIG. 1 illustrates an example of a wireless communications system 100 that supports location accuracy signaling for movable relay nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the UE 115 and the base station 105 may utilize a moving relay to perform LOS beamformed communications. For example, the UE 115 may request a drone configured with an RIS to augment communications with the base station 105. The UE 115 may determine a location and pose where the drone may position itself to provide LOS connectivity (via the RIS) to the base station 105. For example, the UE 115 may utilize a set of mathematical operations to determine a location for the drone. The UE 115 may transmit the location and pose (e.g., pitch, roll, yaw) to the drone, where the drone may spatially relocate to the location based on the transmission and position itself such that an indicated pose is realized. Upon arriving at the indicated location, the UE 115 may perform beamformed communications with the base station 105 via the RIS aboard the drone.

In some cases, however, the location of the drone may not stay constant. For example, in windy conditions, the drone's location and pose may experience variance as the drone compensates for intermittent wind gusts. In such cases, the UE 115, the base station 105, or both, may be unaware of the accuracy with which the drone is maintaining an indicated location and pose. Moreover, a variance corresponding to the location of the drone may influence the drone's ability to receive and reflect beamformed transmissions from the UE 115 and the base station 105. The present disclosure describes leveraging a location variance report which may enable more robust and accurate communications between the base station 105 and the UE 115 via the drone, which may improve overall UE throughputs and coverage in diverse environments. By communicating location variance via the location variance report, the UE, the base station, or both, may issue one or more instructions to compensate for the location variance, which may improve network throughput, network reliability, and improve latency.

Figure 2:
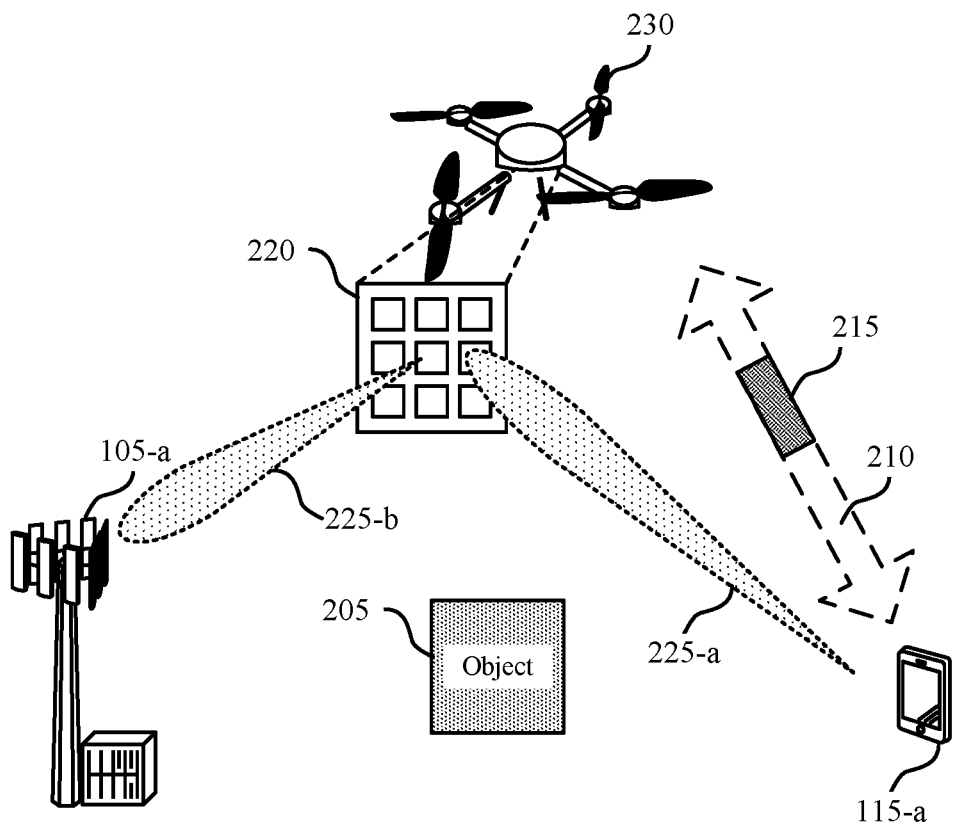
FIG. 2 illustrates an example of a wireless communications system that supports location accuracy signaling for movable relay nodes in accordance with aspects of the present disclosure.

FIG. 2 illustrates an example of a wireless communications system 200 that supports location accuracy signaling for movable relay nodes in accordance with aspects of the present disclosure. The wireless communications system 200 may implement or be implemented by one or more aspects of the wireless communications system 100. For example, the wireless communications system 200 may include a UE 115-*a*, a movable relay node 230, and a base station 105-*a*. The UE 115-*a* and the base station 105-*a* may be examples of the UE 115 and the base station 105 as described with reference to FIG. 1. In some cases, the movable relay node 230 may be an example of a UE 115 or may exhibit characteristics similar to a UE 115 described with reference to FIG. 1. The base station 105-*a* and the UE 115-*a* may communicate within a geographic coverage area. In the wireless communications system 200, the base station 105-*a* may use a movable relay node 230 to communicate with the UE 115-*a* when a communication link (e.g., a LOS channel) between the base station 105-*a* and the UE 115-*a* is blocked by an obstruction (e.g., object 205). In some examples, the UE 115-*a*, the base station 105-*a*, and the movable relay node 230 may communicate using beamformed communications 225. While examples are discussed below, any number of devices and device types may be used to accomplish implementations described in the present disclosure.

The UE 115-*a* and the base station 105-*a* may correspond to devices utilizing mmW technology (e.g., 5G technology), which may utilize one or more high frequency spectrums (e.g., FR2) for communication. In some examples, while attempting to establish beam connectivity, the UE 115-*a*, the base station 105-*a*, or both, may determine that establishing a direct LOS communication may not be possible. In such cases, the UE 115-*a* and the base station 105-*a* may attempt NLOS communications. However, in high operating frequencies, NLOS may not provide adequate connectivity. In such cases, one or more beams associated with establishing beam connectivity (operating in higher carrier frequencies) may experience path loss, atmospheric attenuation, blocking, or some combination thereof. Thus, in some wireless communications systems, communicating in NLOS channels (where UE and base station have no visual direct path between the active antenna arrays) may present some challenges. Due to the increase in free space path loss (e.g., from Friis transmission equation) and atmosphere attenuation when the carrier frequency increases, the LOS may be considered important for some frequency bands (LOS has a smaller distance compared to NLOS channels). Additionally, this challenge is expected to become more prominent with the FR4 & FR5 frequencies (6G).

In some examples, wireless communications systems may support addition of more cells in places with no coverage or no LOS channel. This increases the cost of communication and is not dynamic (it takes a long time to place the static cells). Other approaches may include placing a movable relay node, which can provide the LOS between the UE and the base station. As depicted herein, movable relay node may be an example of a drone, a vehicle, a robot, or any other element possessing the capability to change its location dynamically. The UE 115-*a* may include a capability to find a movable relay node using one or more of UE location, base station location, current movement of the UE, future estimated movement of the UE, a maximum permissible exposure (MPE), a sensor fusion (such as in XR glasses, for finding blockers or other interference sources), UE array capabilities, and a combination thereof. However, in some examples, the UE may not be aware of an accuracy of the movable relay node to stay at a particular location.

When deploying a moveable relay node 230, either the UE 115-*a* or the base station 105-*a* may act as a control node over the movable relay node 230. A control node may refer to the entity that manages the different parameters and characteristics of the movable relay node 230, such as location, altitude, beam width of a RIS, position of a RIS, or other parameters or characteristics. As part of controlling the movable relay node 230, the control node may exchange message and reports with movable relay node 230. A communication link may be established between a first node and a second node via the movable relay node 230. The first node may be an example of a base station 105-*a* or 115-*a* and may act as the control node of the movable relay node 230. The second node may be an example of a base station 105-*a* or UE 115-*a* and may not act as the control node of the movable relay node 230.

One or more aspects depicted herein provide for a movable relay node accuracy report which will enable more robust and accurate UE to movable relay node to base station communication. Additionally or alternatively, the movable relay node accuracy report may improve the UE throughput or coverage. In some examples, the movable relay node accuracy report may influence the beam width (in most cases larger beam is more robust but has less array gain and directivity gain—this can be improved with the movable relay node accuracy report), the movable relay node location (a location far away from the UE or base station may have greater beam width but larger path loss and may suffer from stronger location interferers, like wind) or the movable relay node plane (the movable relay node stabilization may depend on the angle between the interferer and the movable relay node). Thus, aspects depicted herein provide for a movable relay node accuracy report for location accuracy and for improving channel robustness and conditions in mmW and the higher carrier frequency bands.

As depicted in the example of FIG. 2, an object 205 may block beamformed communications between the UE 115-*a* and the base station 105-*a*. In some examples, a signal quality at a receiver may not satisfy one or more metrics associated with a corresponding communication. In such cases, the control node (such as the UE 115-*a* or the base station 105-*a*) may determine to utilize one or more movable relay nodes as an intermediary to re-establish LOS communications. The movable relay node 230 may correspond to a drone, vehicle, robot, or the like. Additionally, the one or more movable relay nodes may carry or be otherwise coupled with a RIS 220 (e.g., a RIS that is coupled with the movable relay node 230), which may allow the movable relay node 230 to coordinate with one or more wireless devices, intercept transmitted beamformed communications (e.g., beamformed communication 225-*a*), and divert beamformed communications such that the beamformed communications circumvent potential blockers while maintaining communications with an intended receiver (e.g., beamformed communication 225-*b*).

In some examples, the UE 115-*a* may send a request to the base station 105-*a* to provide one or more drones (e.g., movable relay node 230) to act as a relay while maintaining LOS communications between the UE 115-*a* and the base station 105-*a*. Specifically, the UE 115-*a* and the base station 105-*a* may communicate via the RIS 220 aboard the movable relay node 230. In some instances, the UE 115-*a* may establish a connection with the movable relay node 230 positioned at a first location. In some examples, such as those illustrated in FIG. 2, in response to the UE 115-*a* acting as the control node of the movable relay node 230, the UE 115-*a* may establish a sidelink connection 210 directly with the movable relay node 230 (without an indication from the base station 105-*a*). In either case, once the control node has established a connection with the movable relay node 230, the base station 105-*a*, the UE 115-*a*, the movable relay node 230, or some combination thereof may perform a link optimization. The control node (e.g., the UE 115-*a*, the base station 105-*a*, or both) may determine an initial location and an initial pose associated with the movable relay node 230. Based on the initial location and pose, the UE 115-*a*, the base station 105-*a*, or both, may signal a location, pose, or both, to which the movable relay node 230 may conform to in order to enhance communications between the UE 115-*a* and the base station 105-*a*.

The movable relay node 230 may move to the signaled location and adjust one or more operating parameters associated with the movable relay node 230 based on the signaled location and pose. For example, the movable relay node 230 may alter a pitch, a roll, a yaw, or a combination thereof associated with the movable relay node 230 such that an angle of a plane associated with the RIS 220 and the angle of arrival (AOA) of the beamformed communications 225 improves channel conditions associated with the base station 105-*a*, the UE 115-*a*, and the movable relay node 230.

In some cases, once the movable relay node 230 arrives at the indicated location and pose, the movable relay node 230 may measure a location variance associated with the current location of the movable relay node 230. For example, the movable relay node 230 may measure a mismatch between the indicated location and an actual location occupied by the movable relay node 230 using one or more measurement techniques. In some instances, the measurement techniques with which the movable relay node 230 may measure the mismatch (e.g., location variance) may be associated with a global navigation satellite system (GNSS), an onboard speed sensor or acceleration sensors, or the like. The location variance may be characterized based on per-axis measurements. The movable relay node 230 may signal the location variance to the UE 115-*a* via a message 215 (e.g., via physical sidelink shared channel (PSSCH), physical sidelink control channel (PSCCH), physical sidelink broadcast channel (PSBCH) or PDSCH). In some examples, the location variance may be based on a predefined coordinate system (e.g., such as a geographic coordinate system). It may be noted that, while sidelink messages are used to elucidate one or more aspects of the present disclosure, indicating location variance is not limited to sidelink messages, and may be implemented by any multitude of signaling channels and techniques.

Based on the message 215, the UE 115-*a* (acting as the control node) may adjust a set of operational parameters corresponding to the movable relay node 230. In some examples, the message 215 may be communicated over a sidelink communication link between the UE 115-*a* and the movable relay node 230. In some examples, if the base station 105-*a* is the control node, the message 215 may be communicated between the movable relay node 230 and the base station 105-*a* and the base station 105-*a* may perform at least some of the functions described as being performed by the UE 115-a. The movable relay node 230 may dynamically change locations according to the message 215 for supplying channel conditions (e.g., such as LOS channel) in higher bands. The message 215 may be a lower payload report including a request for a wider beam by a specified factor (e.g., ×2), where the factor may be determined by reference signal receive power (RSRP) measurements made by the movable relay node 230 during movement. Based on the RSRP measurements, the movable relay node 230 may indicate which beam width may improve signal throughput between the UE 115-a and the base station 105-a.

In other examples, the control node (e.g., the UE 115-a) may instruct the movable relay node 230 to reposition due to high location variance relative to a measured beam width (e.g., which may be indicated in the message 215 as a single bit indicating, to the movable relay node 230, whether to change position or not). By leveraging the movable relay node 230 and a location variance report, more robust and accurate communications between the UE 115-a and the movable relay node 230 and the base station 105-a may be realized, which may correspond to improved throughputs and coverage at the UE 115-a. Such techniques are described in greater detail with reference to FIGS. 3 and 4.

Figure 3:
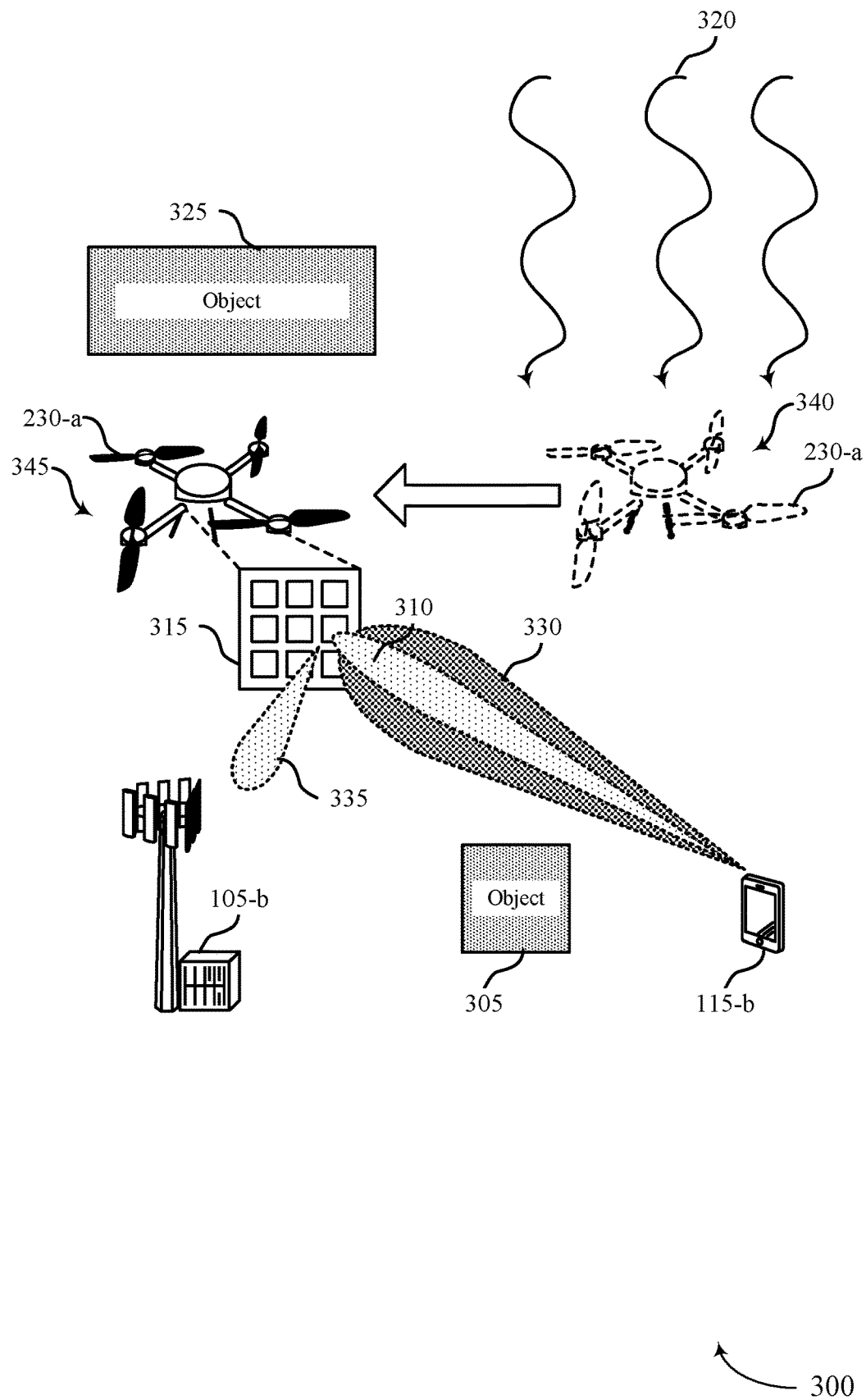
FIG. 3 illustrates an example of a wireless communications system that supports location accuracy signaling for movable relay nodes in accordance with aspects of the present disclosure.

FIG. 3 illustrates an example of a wireless communications system 300 that supports location accuracy signaling for movable relay nodes in accordance with aspects of the present disclosure. The wireless communications system 300 may include one or more aspects of the wireless communications system 100 and the wireless communications system 200. For example, the wireless communications system 300 may correspond to communications between a UE 115-b, a movable relay node 230-a, and a base station 105-b, which may be examples of the UE 115, and the base station 105 as described with reference to FIG. 1. While examples are discussed below, any number of devices and device types may be used to accomplish implementations described in the present disclosure.

The base station 105-b and the UE 115-b may communicate over one or more beamformed communications (e.g., an uplink beam 310 and a downlink beam 335). In such cases, one or more beams associated with establishing beam connectivity may experience path loss, atmospheric attenuation, blocking, or some combination thereof, due to utilizing higher carrier frequencies. For example, an object 305 may block beamformed communications between the UE 115-b and the base station 105-b such that signal quality at a receiver does not satisfy one or more metrics associated with a corresponding communication. In such cases, a node in the communication link (e.g., a UE 115-b or base station 105-b or both) may determine to utilize one or more movable relay nodes as an intermediary to re-establish LOS communications.

As discussed previously with reference to FIG. 2, the UE 115-b may send a request to the base station 105-b to supply one or more drones (e.g., movable relay node 230-a) or may request that it may deploy its associated drove to act as a relay while maintaining LOS communications between the UE 115-b and the base station 105-b. The control node of the movable relay node (e.g., the UE 115-b, the base station 105-b, or both) may determine an initial location and pose associated with the movable relay node 230-a. Based on the initial location and pose, the control node (e.g., the UE 115-b, the base station 105-b, or both) may signal a location, pose, or both, to which the movable relay node 230-a may conform with to optimize or improve communications between the UE 115-b and the base station 105-b.

The movable relay node 230-a may move to the signaled location and adjust one or more operating parameters associated with the movable relay node 230-a based on the signaled location and pose. For example, the movable relay node 230-a may alter a pitch, a roll, a yaw, or a combination thereof associated with the movable relay node 230 such that an angle of a plane associated with the RIS 315 and the AOA of the beamformed communications improves channel conditions associated with the base station 105-b, the UE 115-b, and the movable relay node 230-a.

In some cases, once the movable relay node 230-a arrives at the indicated location and pose, the movable relay node 230-a may measure a location variance associated with the current location of the movable relay node 230-a. Based on the location variance associated with the current location, the movable relay node 230-a may transmit a message to the control node (e.g., the UE 115-b or the base station 105-a) characterizing a level of location variance experienced at the movable relay node 230-a. The location variance may capture possible movement of the movable relay node 230-a according to strong weather impacts, stabilizing algorithms, angle of the movable relay node 230-a to the ground, or a combination thereof. In some cases, the location variance may exceed one or more variance thresholds.

Based on the message and the one or more variance thresholds, the control node may adjust a set of operational parameters corresponding to the movable relay node 230-a. The control node may transmit a location message that instructs the movable relay node 230-a to reposition (e.g., from a first location to a second location) due to high location variance relative to a measured beam width. For example, the movable relay node 230-a may be positioned at a location experiencing high wind 320, inclement weather, or both, which may cause the movable relay node 230-a from a first location 340 to a second location 345. In the case of inclement weather, snow or rain may result in unintended scattering or interference at the movable relay node 230-a. In the case of high wind 320, the movable relay node 230-a may experience turbulence and fluctuating wind speed, which may result in a variation of the location corresponding to the movable relay node 230-a.

Additionally or alternatively, high wind 320 may result in a variance in the pitch, roll, yaw, or some combination thereof, corresponding to the movable relay node 230-a. Based on the indicated location variance, the control node may alter one or more operation parameters to mitigate environmental effects while increasing signal reliability and throughput. As an example, the control node may instruct the movable relay node 230-a to alter one or more operational parameters (e.g., move from first location to a second location, where the second location is screened from high wind 320, inclement weather, or both by a blocker 325) to mitigate one or more environmental or spectral detriments. Changing locations may include moving to a different altitude (e.g., in the case that high variance is associated with high wind 320), moving into a different street, under a rain blocker in the case of rain or snow interfering with measurements at the movable relay node 230-a, or any combination thereof. Based on the instructions from the UE 115-b, the movable relay node 230-a may reposition (e.g., from the first location 340 to the second location 345) to compensate for an increase in location variance.

In other examples, the control node may instruct the movable relay node 230-a to alter a distance relative to the UE 115-b and/or the base station 105-b to increase effects of beam spatial coverage (e.g., plane waves, in most cases, open as a function of distance, beam waist may increase as a function of distance, etc.). For example, larger distance half power beam width (HPBW) is expected to capture a larger surface but at the price of larger free space loss.

In some other examples, the control node may determine to increase beam width to increase network reliability. For example, the movable relay node 230-a may indicate a beam width for a beam used to communicate with the movable relay node 230-a. In some examples, there may exist a tradeoff between a more robust, large beam with less array and directivity gain. For example, if the movable relay node 230-a is far away from the UE 115-b and the base station 105-b, the movable relay node 230-a may communicate using a greater beam width accompanied with a larger path loss, more potential interferers (e.g., wind), and altered location variance (e.g., drone stabilization may depend on the angle between the interferer and drone). However, by leveraging the location variance report (e.g., the indicated beam width), the control node may optimize or improve this tradeoff by adjusting parameters (e.g., location) of the movable relay node 230-a.

In some examples, the control node may determine that a beam width associated with beamformed communication 310 may provide a lower network reliability based on the location variance report. In other examples, the movable relay node 230-a may indicate a factor by which to alter the beam width associated with communications between the UE 115-b and the movable relay node 230-a. Based on the location variance report, the control node may instantiate a wider beamformed communication 330 to compensate for the location variance reported by the movable relay node 230-a while maintaining adequate signal strength. The control node may reduce or increase a diameter associated with an antenna array to increase beam width. In some cases, the control node may increase beam width at the transmitter, which may correspond to a wider beam at the RIS 315. Additionally, increasing the diameter associated with an antenna array may also influence the number of elements used, and thus, may affect array gain.

Additionally or alternatively, the control node may instruct the movable relay node 230-a to change a plane angle associated with the RIS 315. In some cases, the instruction to change the plane angle may increase flux associated with beamformed communication 330. In some cases, adjusting the plane angle may also improve drone stabilization (e.g., in case the movable relay node 230-a includes a preferred plane angle in the variance location report message).

Techniques described in the present disclosure may not be limited to a single movable relay node 230-a. For example, the control node may utilize multiple beams to communicate with multiple relay nodes, each equipped with at least one RIS to enable LOS communications in dense environments.

Figure 4:
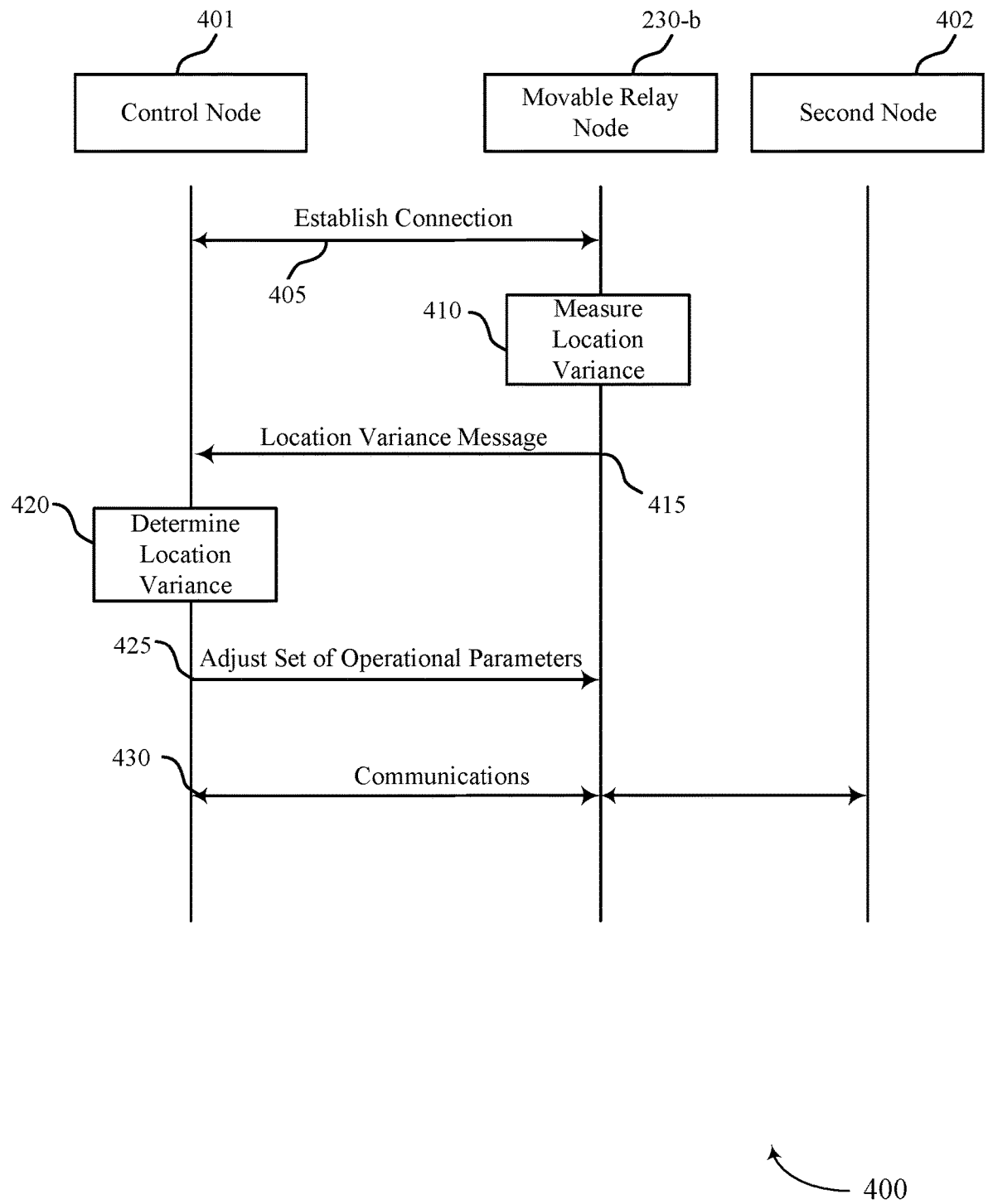
FIG. 4 illustrates an example of a process flow that supports location accuracy signaling for movable relay nodes in accordance with aspects of the present disclosure.

FIG. 4 illustrates an example of a process flow 400 that supports location accuracy signaling for movable relay nodes in accordance with aspects of the present disclosure. The process flow 400 may be implemented by one or more aspects of the wireless communications system 100, the wireless communications system 200, and the wireless communications system 300. For example, the process flow 400 may correspond to communications between a control node 401 (e.g., a UE or a base station), a movable relay node 230-b, and a second node 402 (e.g., a UE or base station). The control node 401 and the second node 402 may be examples of the UEs 115 and the base stations 105 as described with reference to FIGS. 1-3. The movable relay node 230-b may be an example of the movable relay nodes 230 described with reference to FIGS. 2-3.

While examples are discussed below, any number of devices and device types may be used to accomplish implementations described in the present disclosure. In the following description of the process flow 400, operations between the control node 401, the movable relay node 230-b, and the second node 402 may occur in a different order or at different times than as shown. Some operations may also be omitted from the process flow 400, and other operations may be added to the process flow 400.

At 405, the control node 401 may establish a connection with the movable relay node 230-b to communicate with the second node 402 (e.g., due to a lack of LOS, disrupted signal quality, inclement weather, or the like). In some examples, the movable relay node 230-b may be located at a first location, which may be a first distance from the control node 401 and a second distance from the second node 402.

At 410, the movable relay node 230-b may measure location variance corresponding to the current location of the movable relay node 230-b. Measurement of the location variance may be based on a per axis measurement, measurements taken from an onboard accelerometer, based on GNSS measurements, messaging between the movable relay node 230-b, or a combination thereof.

At 415, based on the measurement of location variance at 410, the movable relay node 230-b may transmit a location variance message to the control node 401. In some examples, the location variance message may be communicated over a PDSCH RRC message, a medium access control (MAC) control element (MAC-CE), or both. In other cases, the location variance may be indicated via a PSSCH message (e.g., in examples when the UE 115 is the control node 401). Additionally or alternatively, the message indicating the measurement of location variance may correspond to periodic or aperiodic messages. In some cases, the location variance message may include a request indicating a beam width for a beam used to communicate with the movable relay node 230-b. In some cases, the location variance message may include a request for a second beam width wider (or narrower) than a first beam width by a factor, where the location variance for the movable relay node 230-b may be determined based at least in part on the first beam width.

At 420, the control node 401 may determine location variance corresponding to the movable relay node 230-b. In some examples, the control node 401 may determine to adjust a set of operational parameters associated with the movable relay node 230-b based on the location variance message. For example, the control node 401 may determine that the movable relay node 230-b may improve signaling by changing a distance between the movable relay node 230-b and the second node 402 and/or a distance between the movable relay node 230-b and the control node 401. Specifically, the control node 401 may determine that the movable relay node 230-b may improve network coverage if the movable relay node 230-b moved to be a third distance from the second node 402 which may be greater or less than the second distance. In some cases, the control node 401 may transmit an indication of a selected beam width for communicating with the movable relay node 230-b. Adjusting the set of operational parameters may include adjusting a current beam width for the beam used to communicate with the movable relay node 230-b to the selected beam width.

At 425, the control node 401 may adjust the set of operational parameters corresponding to the movable relay node 230-b based on determining the location variance at 420. For example, the control node 401 may instruct the movable relay node 230-*b* to change an associated distance between the movable relay node 230-*b* and the second node 402. For example, the control node 401 may indicate, to the movable relay node 230-*b*, that the movable relay node 230-*b* may improve network coverage by changing the distance from the movable relay node 230-*b* from the second distance to the third distance to improve signaling. At 430, based on the adjusted set of operational parameters, the control node 401 may perform beamformed communications with the second node 402 via the movable relay node 230-*b*.

Figure 5:
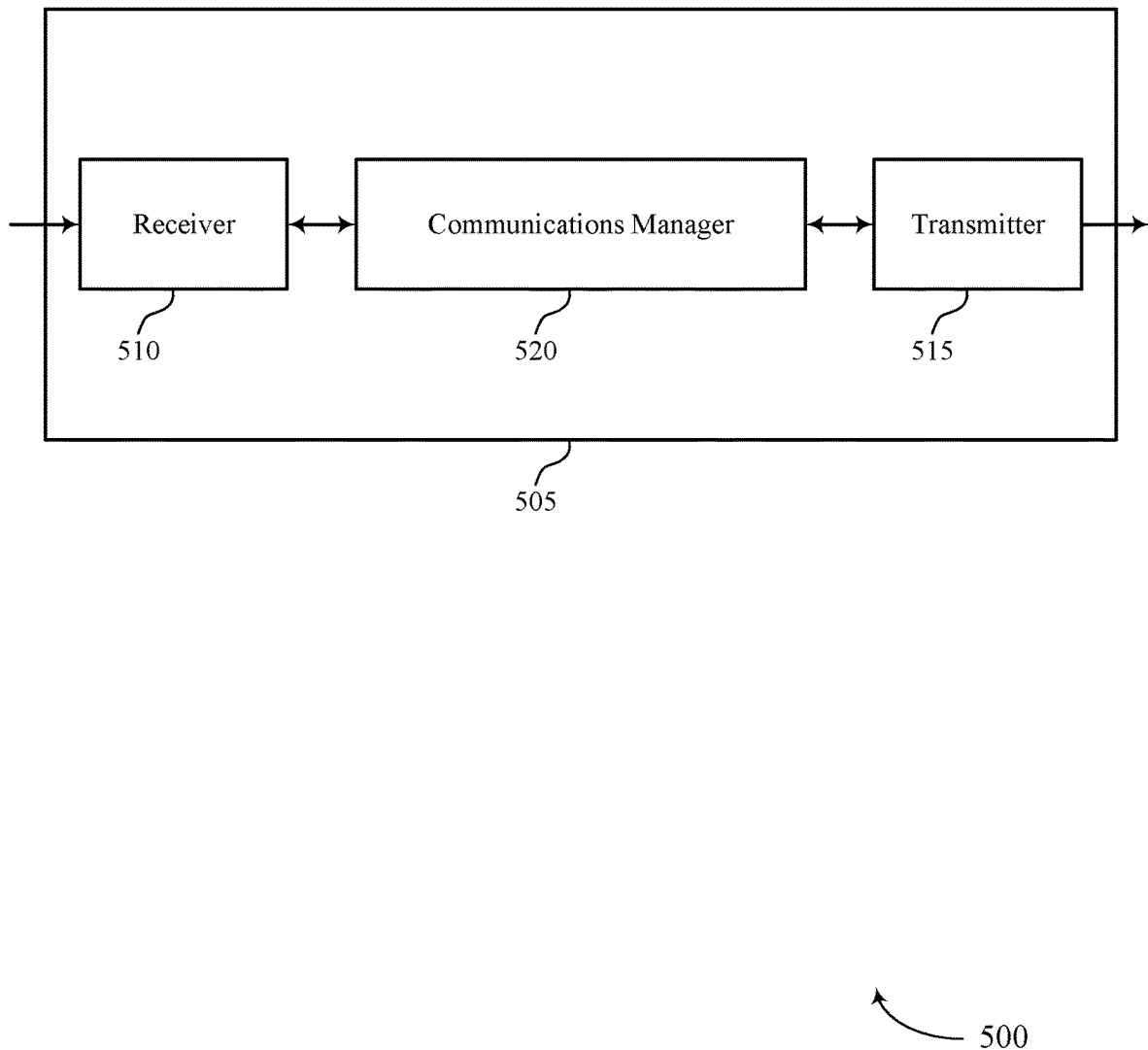
FIGS. 5 and 6 show block diagrams of devices that support location accuracy signaling for movable relay nodes in accordance with aspects of the present disclosure.

FIG. 5 shows a block diagram 500 of a device 505 that supports location accuracy signaling for movable relay nodes in accordance with aspects of the present disclosure. The device 505 may be an example of aspects of a control node (e.g., a UE 115 or a base station 105) as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to location accuracy signaling for movable relay nodes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to location accuracy signaling for movable relay nodes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of location accuracy signaling for movable relay nodes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a control node in accordance with examples as disclosed herein. For example, the communications manager 520 may be configured as or otherwise support a means for establishing a connection with a movable relay node positioned at a first location. The communications manager 520 may be configured as or otherwise support a means for receiving, from the movable relay node and based on establishing the connection, a message indicating a location variance for the movable relay node at the first location. The communications manager 520 may be configured as or otherwise support a means for adjusting a set of operational parameters for the movable relay node based on receiving the message indicating the location variance for the movable relay node.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing processing and power consumption by utilizing a movable relay node to establish LOS communications. Notably, by establishing LOS communications, one or more devices may avoid beam training procedures that may be associated with NLOS communications.

Figure 6:
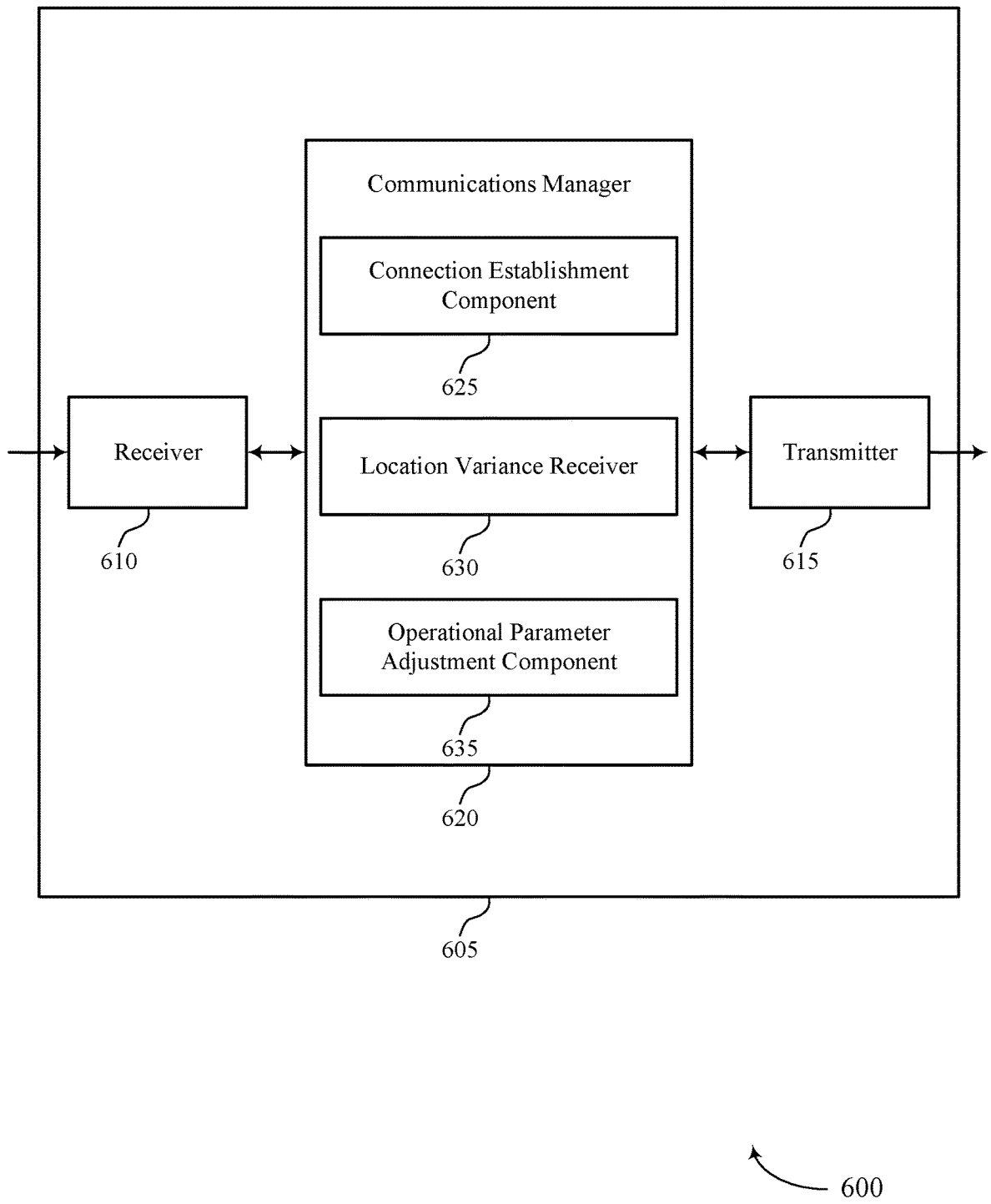

FIG. 6 shows a block diagram 600 of a device 605 that supports location accuracy signaling for movable relay nodes in accordance with aspects of the present disclosure. The device 605 may be an example of aspects of a device 505 or a control node (e.g., a UE 115 or a base station 105) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to location accuracy signaling for movable relay nodes). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to location accuracy signaling for movable relay nodes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of location accuracy signaling for movable relay nodes as described herein. For example, the communications manager 620 may include a connection establishment component 625, a location variance receiver 630, an operational parameter adjustment component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a control node in accordance with examples as disclosed herein. The connection establishment component 625 may be configured as or otherwise support a means for establishing a connection with a movable relay node positioned at a first location. The location variance receiver 630 may be configured as or otherwise support a means for receiving, from the movable relay node and based on establishing the connection, a message indicating a location variance for the movable relay node at the first location. The operational parameter adjustment component 635 may be configured as or otherwise support a means for adjusting a set of operational parameters for the movable relay node based on receiving the message indicating the location variance for the movable relay node.

Figure 7:
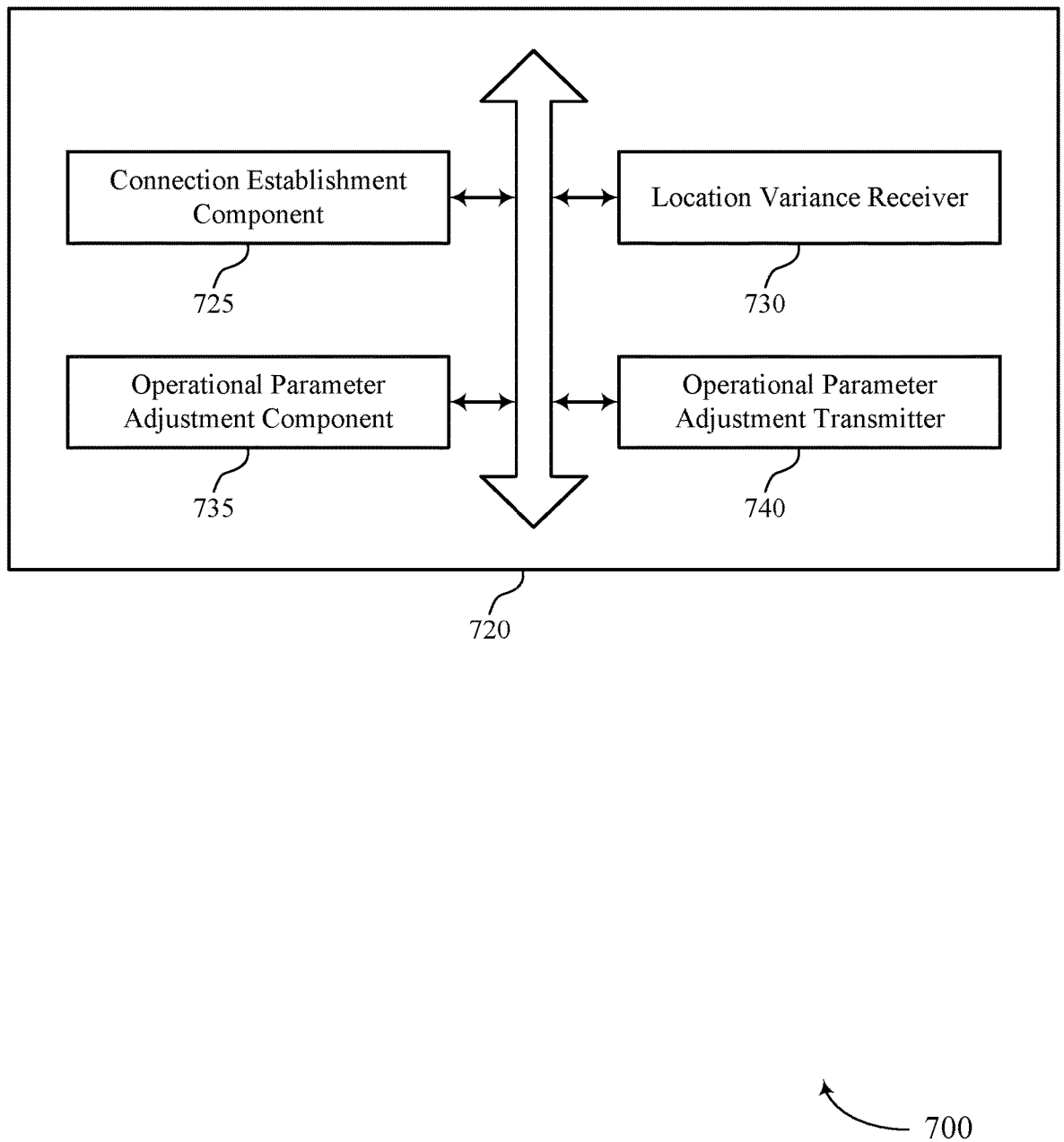
FIG. 7 shows a block diagram of a communications manager that supports location accuracy signaling for movable relay nodes in accordance with aspects of the present disclosure.

FIG. 7 shows a block diagram 700 of a communications manager 720 that supports location accuracy signaling for movable relay nodes in accordance with aspects of the present disclosure. The communications manager 720 may be an example of aspects of a communications manager 520, a communications manager 620, or both, as described herein. The communications manager 720, or various components thereof, may be an example of means for performing various aspects of location accuracy signaling for movable relay nodes as described herein. For example, the communications manager 720 may include a connection establishment component 725, a location variance receiver 730, an operational parameter adjustment component 735, an operational parameter adjustment transmitter 740, or any combination thereof. Each of these components may communicate, directly or indirectly, with one another (e.g., via one or more buses).

The communications manager 720 may support wireless communications at a control node in accordance with examples as disclosed herein. The connection establishment component 725 may be configured as or otherwise support a means for establishing a connection with a movable relay node positioned at a first location. The location variance receiver 730 may be configured as or otherwise support a means for receiving, from the movable relay node and based on establishing the connection, a message indicating a location variance for the movable relay node at the first location. The operational parameter adjustment component 735 may be configured as or otherwise support a means for adjusting a set of operational parameters for the movable relay node based on receiving the message indicating the location variance for the movable relay node.

In some examples, to support receiving the message, the location variance receiver 730 may be configured as or otherwise support a means for receiving a request for the movable relay node to move to a second location based on determining that the location variance for the movable relay node at the first location is greater than a threshold.

In some examples, the operational parameter adjustment transmitter 740 may be configured as or otherwise support a means for transmitting, to the movable relay node at the first location and based on receiving the request, a location message indicating the second location for the movable relay node, where adjusting the set of operational parameters is based on transmitting the location message.

In some examples, to support receiving the message, the location variance receiver 730 may be configured as or otherwise support a means for receiving a request indicating a beam width for a beam used to communicate with the movable relay node, where adjusting the set of operational parameters is based on receiving the request indicating the beam width.

In some examples, the operational parameter adjustment transmitter 740 may be configured as or otherwise support a means for transmitting, to the movable relay node at the first location and based on receiving the request of the beam width, an indication of a selected beam width for communicating with the movable relay node, where adjusting the set of operational parameters includes adjusting a current beam width for the beam used to communicate with the movable relay node to the selected beam width.

In some examples, to support receiving the message, the location variance receiver 730 may be configured as or otherwise support a means for receiving a request for a second beam width wider than a first beam width by a factor, where the location variance for the movable relay node is determined based on the first beam width.

In some examples, the operational parameter adjustment transmitter 740 may be configured as or otherwise support a means for transmitting, to the movable relay node at the first location and based on receiving the message indicating the location variance, an indication of a distance between the movable relay node and a second node, where adjusting the set of operational parameters is based on transmitting the indication of the distance. In some examples, the control node includes a UE and the second node includes a base station.

In some examples, the operational parameter adjustment transmitter 740 may be configured as or otherwise support a means for transmitting, to the movable relay node at the first location and based on receiving the message indicating the location variance, an indication of a second value associated with a reconfigurable intelligent surface plane angle for the movable relay node, where adjusting the set of operational parameters is based on transmitting the indication of the second value.

In some examples, to support receiving the message, the location variance receiver 730 may be configured as or otherwise support a means for receiving a physical downlink shared channel including the message indicating the location variance for the movable relay node, where the message includes a radio resource control message, a MAC-CE, or both.

In some examples, to support receiving the message, the location variance receiver 730 may be configured as or otherwise support a means for receiving a physical sidelink shared channel including the message indicating the location variance for the movable relay node. In some examples, the message includes a periodic message or an aperiodic message. In some examples, the location variance is in accordance with an axis of the movable relay node, or a geographic coordinate system, or both. In some examples, the control node includes a UE or a base station or both. In some examples, the control node includes a base station and a second node includes a UE.

Figure 8:
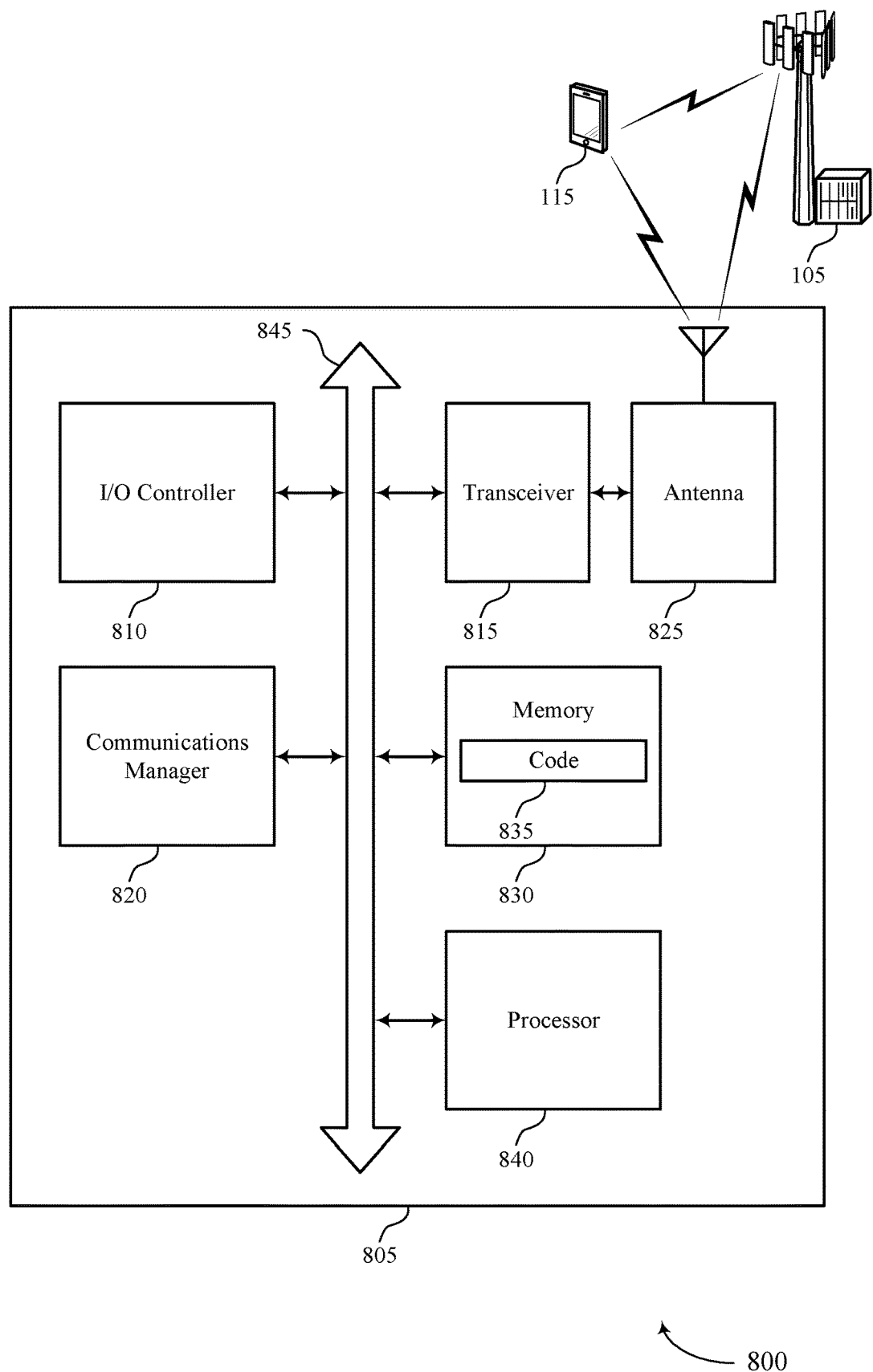
FIG. 8 shows a diagram of a system including a device that supports location accuracy signaling for movable relay nodes in accordance with aspects of the present disclosure.

FIG. 8 shows a diagram of a system 800 including a device 805 that supports location accuracy signaling for movable relay nodes in accordance with aspects of the present disclosure. The device 805 may be an example of or include the components of a device 505, a device 605, or a control node (e.g., a UE 115 or a base station 105) as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting location accuracy signaling for movable relay nodes). For example, the device 805 or a component of the device 805 may include a processor 840 and memory 830 coupled to the processor 840, the processor 840 and memory 830 configured to perform various functions described herein.

The communications manager 820 may support wireless communications at a control node in accordance with examples as disclosed herein. For example, the communications manager 820 may be configured as or otherwise support a means for establishing a connection with a movable relay node positioned at a first location. The communications manager 820 may be configured as or otherwise support a means for receiving, from the movable relay node and based on establishing the connection, a message indicating a location variance for the movable relay node at the first location. The communications manager 820 may be configured as or otherwise support a means for adjusting a set of operational parameters for the movable relay node based on receiving the message indicating the location variance for the movable relay node.

By including or configuring the communications manager 820 in accordance with examples as described herein, the device 805 may support techniques for improved network throughput (e.g., due to increasing a reception area of the RIS), network reliability (e.g., by the movable relay node repositioning such that location variance is reduced), and latency (e.g., by altering one or more beam parameters such that a larger beam cross-section is incident on both the RIS and the receiving device).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of location accuracy signaling for movable relay nodes as described herein, or the processor 840 and the memory 830 may be otherwise configured to perform or support such operations.

Figure 9:
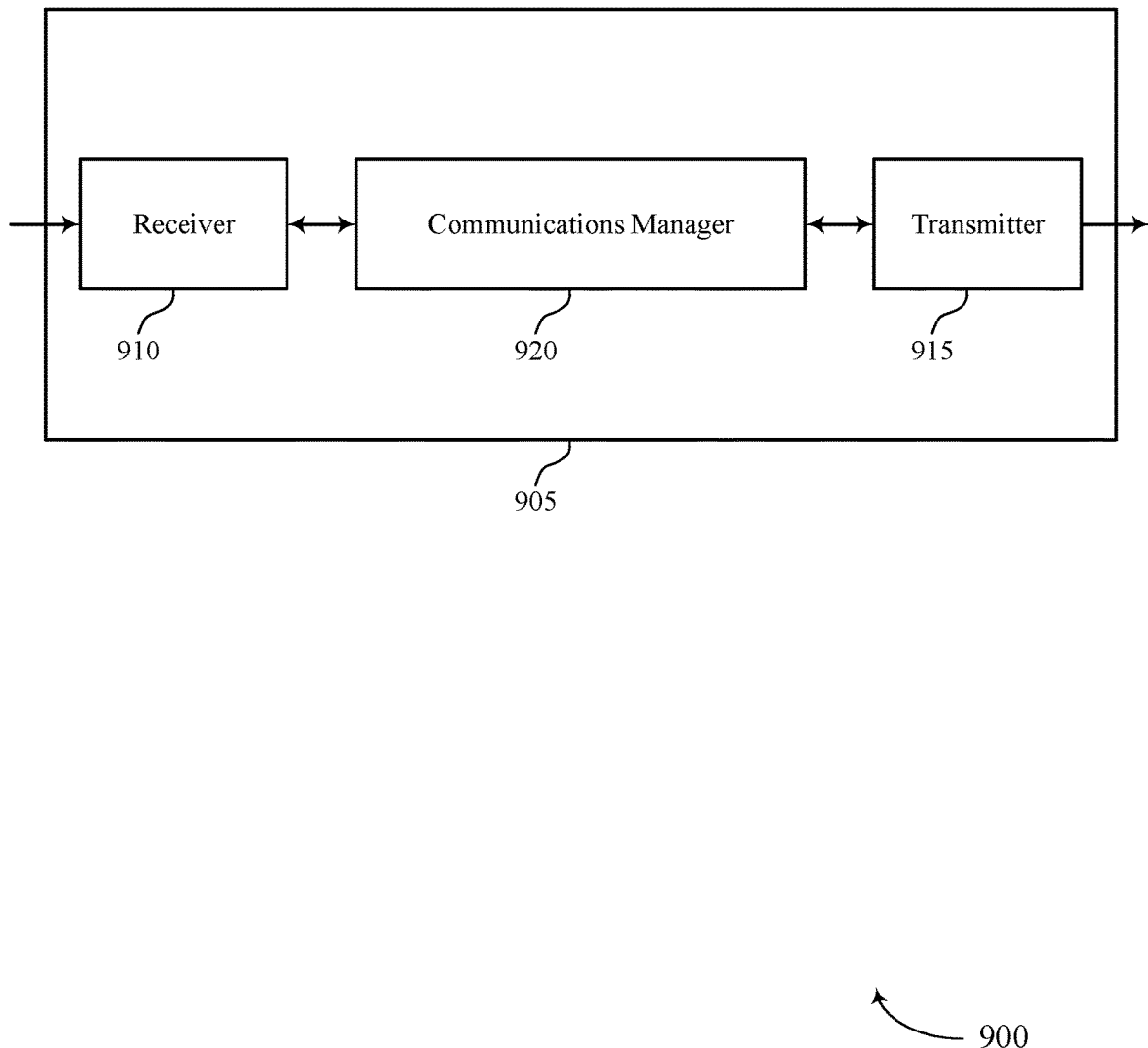
FIGS. 9 and 10 show block diagrams of devices that support location accuracy signaling for movable relay nodes in accordance with aspects of the present disclosure.

FIG. 9 shows a block diagram 900 of a device 905 that supports location accuracy signaling for movable relay nodes in accordance with aspects of the present disclosure. The device 905 may be an example of aspects of a movable relay node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to location accuracy signaling for movable relay nodes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to location accuracy signaling for movable relay nodes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of location accuracy signaling for movable relay nodes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a movable relay node in accordance with examples as disclosed herein. For example, the communications manager 920 may be configured as or otherwise support a means for establishing a connection with a control node, where the movable relay node is positioned at a first location. The communications manager 920 may be configured as or otherwise support a means for transmitting, to the control node and based on establishing the connection, a message indicating a location variance for the movable relay node at the first location. The communications manager 920 may be configured as or otherwise support a means for receiving, from the control node, an indication of an adjusted set of operational parameters for the movable relay node based on transmitting the message indicating the location variance for the movable relay node.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reducing processing and power consumption by utilizing a movable relay node to establish LOS communications. Notably, by establishing LOS communications, one or more devices may avoid beam training procedures that may be associated with NLOS communications.

Figure 10:
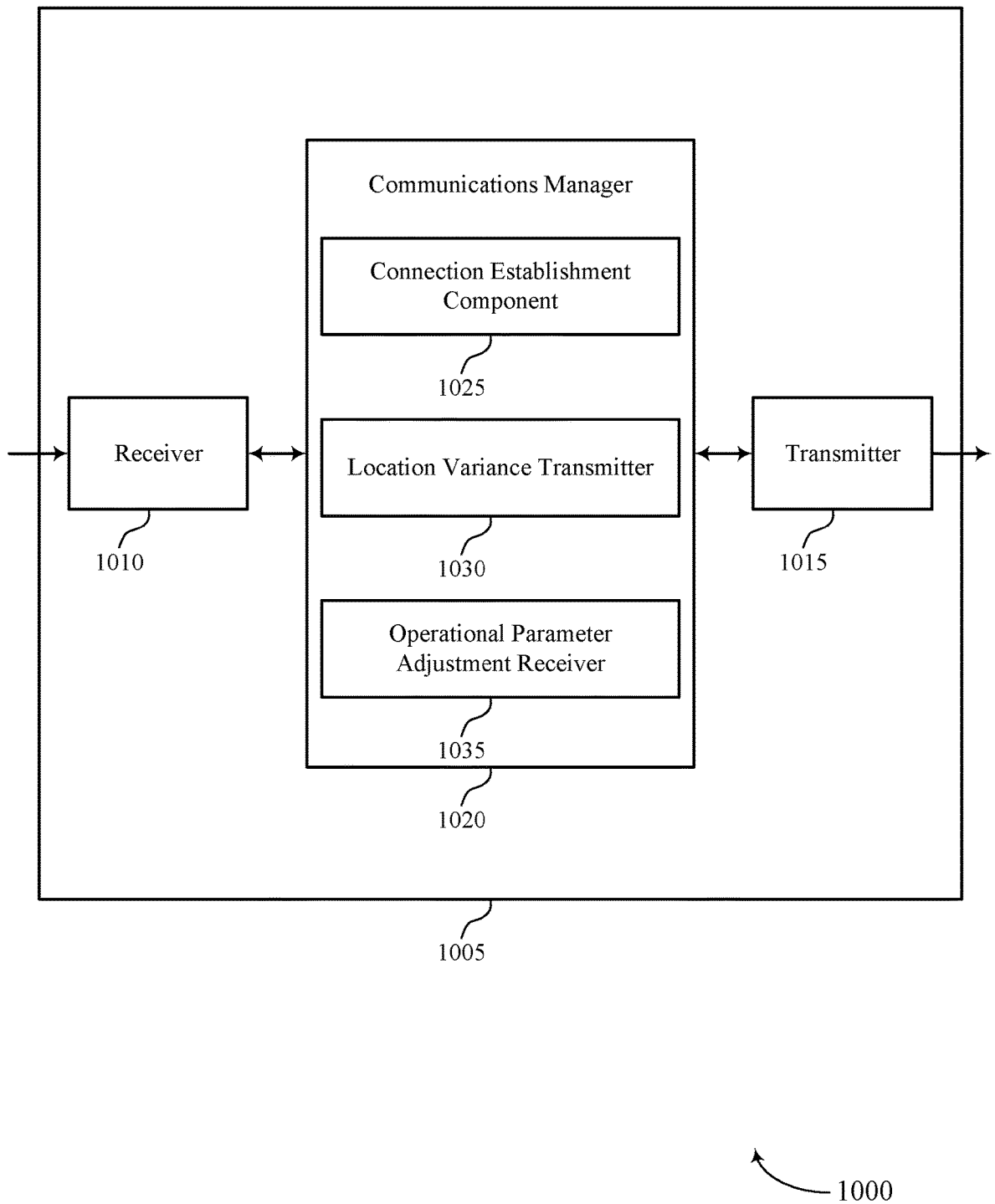

FIG. 10 shows a block diagram 1000 of a device 1005 that supports location accuracy signaling for movable relay nodes in accordance with aspects of the present disclosure. The device 1005 may be an example of aspects of a device 905 or a movable relay node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to location accuracy signaling for movable relay nodes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to location accuracy signaling for movable relay nodes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of location accuracy signaling for movable relay nodes as described herein. For example, the communications manager 1020 may include a connection establishment component 1025, a location variance transmitter 1030, an operational parameter adjustment receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a movable relay node in accordance with examples as disclosed herein. The connection establishment component 1025 may be configured as or otherwise support a means for establishing a connection with a control node, where the movable relay node is positioned at a first location. The location variance transmitter 1030 may be configured as or otherwise support a means for transmitting, to the control node and based on establishing the connection, a message indicating a location variance for the movable relay node at the first location. The operational parameter adjustment receiver 1035 may be configured as or otherwise support a means for receiving, from the control node, an indication of an adjusted set of operational parameters for the movable relay node based on transmitting the message indicating the location variance for the movable relay node.

Figure 11:
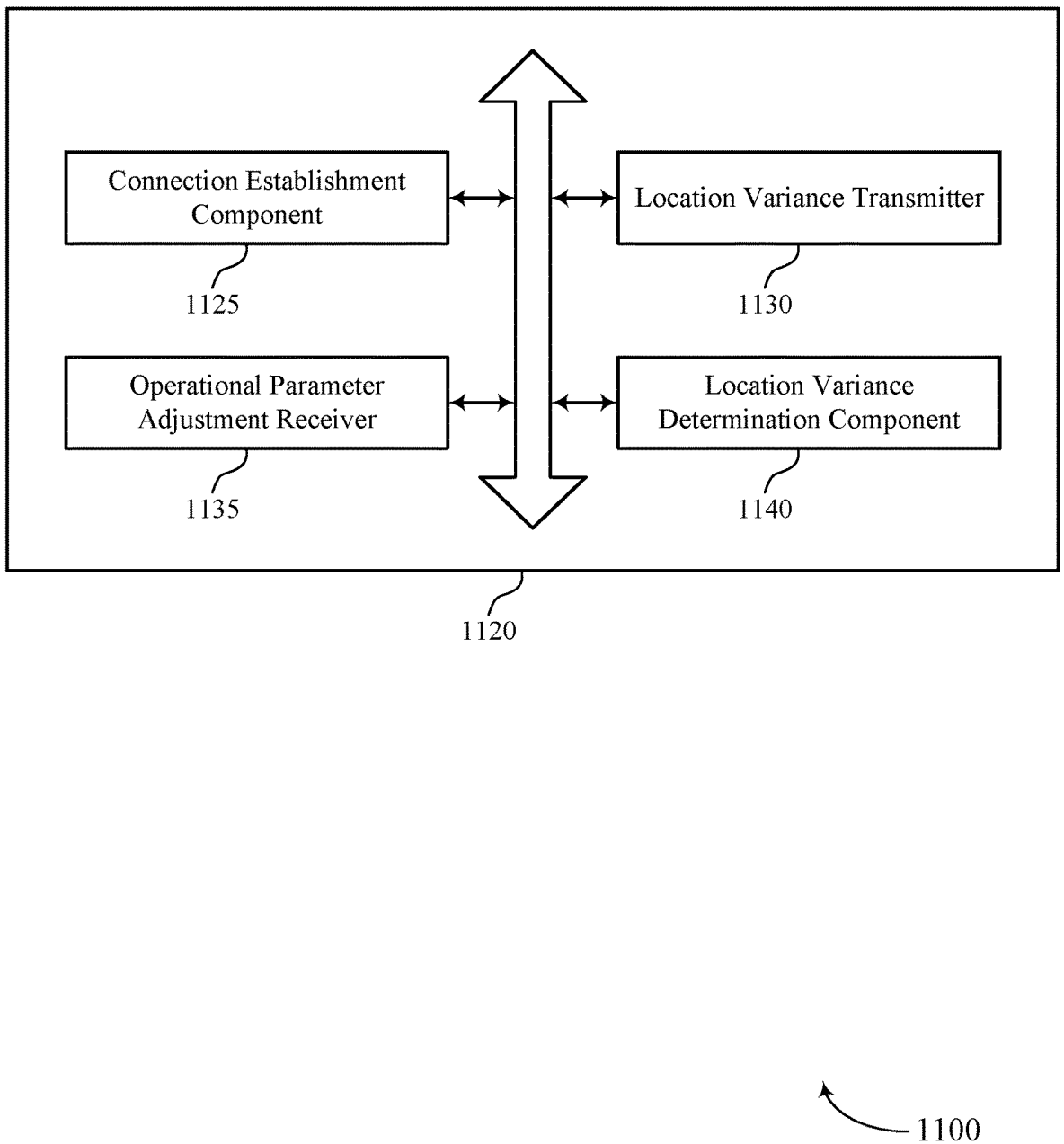
FIG. 11 shows a block diagram of a communications manager that supports location accuracy signaling for movable relay nodes in accordance with aspects of the present disclosure.

FIG. 11 shows a block diagram 1100 of a communications manager 1120 that supports location accuracy signaling for movable relay nodes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of location accuracy signaling for movable relay nodes as described herein. For example, the communications manager 1120 may include a connection establishment component 1125, a location variance transmitter 1130, an operational parameter adjustment receiver 1135, a location variance determination component 1140, or any combination thereof. Each of these components may communicate, directly or indirectly, with one another (e.g., via one or more buses).

The communications manager 1120 may support wireless communications at a movable relay node in accordance with examples as disclosed herein. The connection establishment component 1125 may be configured as or otherwise support a means for establishing a connection with a control node, where the movable relay node is positioned at a first location. The location variance transmitter 1130 may be configured as or otherwise support a means for transmitting, to the control node and based on establishing the connection, a message indicating a location variance for the movable relay node at the first location. The operational parameter adjustment receiver 1135 may be configured as or otherwise support a means for receiving, from the control node, an indication of an adjusted set of operational parameters for the movable relay node based on transmitting the message indicating the location variance for the movable relay node.

In some examples, the location variance determination component 1140 may be configured as or otherwise support a means for determining that the location variance for the movable relay node at the first location is greater than a threshold, where transmitting the message includes transmitting a request for the movable relay node to move to a second location based on determining that the location variance for the movable relay node at the first location is greater than the threshold.

In some examples, the operational parameter adjustment receiver 1135 may be configured as or otherwise support a means for receiving, from the control node and based on transmitting the request, a location message indicating the second location for the movable relay node, where the adjusted set of operational parameters is adjusted based on the location message.

In some examples, to support transmitting the message, the location variance transmitter 1130 may be configured as or otherwise support a means for transmitting a request indicating a beam width for a beam used to communicate with the movable relay node.

In some examples, the operational parameter adjustment receiver 1135 may be configured as or otherwise support a means for receiving, from the control node and based on transmitting the request of the beam width, an indication of a selected beam width for communicating with the movable relay node, where the adjusted set of operational parameters includes adjusting a current beam width for the beam used to communicate with the movable relay node to the selected beam width.

In some examples, the location variance determination component 1140 may be configured as or otherwise support a means for determining the location variance for the movable relay node is determined based on a first beam width, where transmitting the message includes transmitting a request for a second beam width wider than the first beam width by a factor.

In some examples, the operational parameter adjustment receiver 1135 may be configured as or otherwise support a means for receiving, from the control node and based on transmitting the message indicating the location variance, an indication of a distance between the movable relay node and a second node, where the adjusted set of operational parameters is based on the indication of the distance.

In some examples, the control node includes a UE and the second node includes a base station. In some examples, the operational parameter adjustment receiver 1135 may be configured as or otherwise support a means for receiving, from the control node and based on transmitting the message indicating the location variance, an indication of a second value associated with a reconfigurable intelligent surface plane angle for the movable relay node, where the adjusted set of operational parameters is based on the indication of the second value.

In some examples, to support transmitting the message, the location variance transmitter 1130 may be configured as or otherwise support a means for transmitting a physical downlink shared channel including the message indicating the location variance for the movable relay node, where the message includes a radio resource control message, a MAC-CE, or both.

In some examples, to support transmitting the message, the location variance transmitter 1130 may be configured as or otherwise support a means for transmitting a physical sidelink shared channel including the message indicating the location variance for the movable relay node.

In some examples, the location variance is in accordance with an axis of the movable relay node, or a geographic coordinate system, or both.

Figure 12:
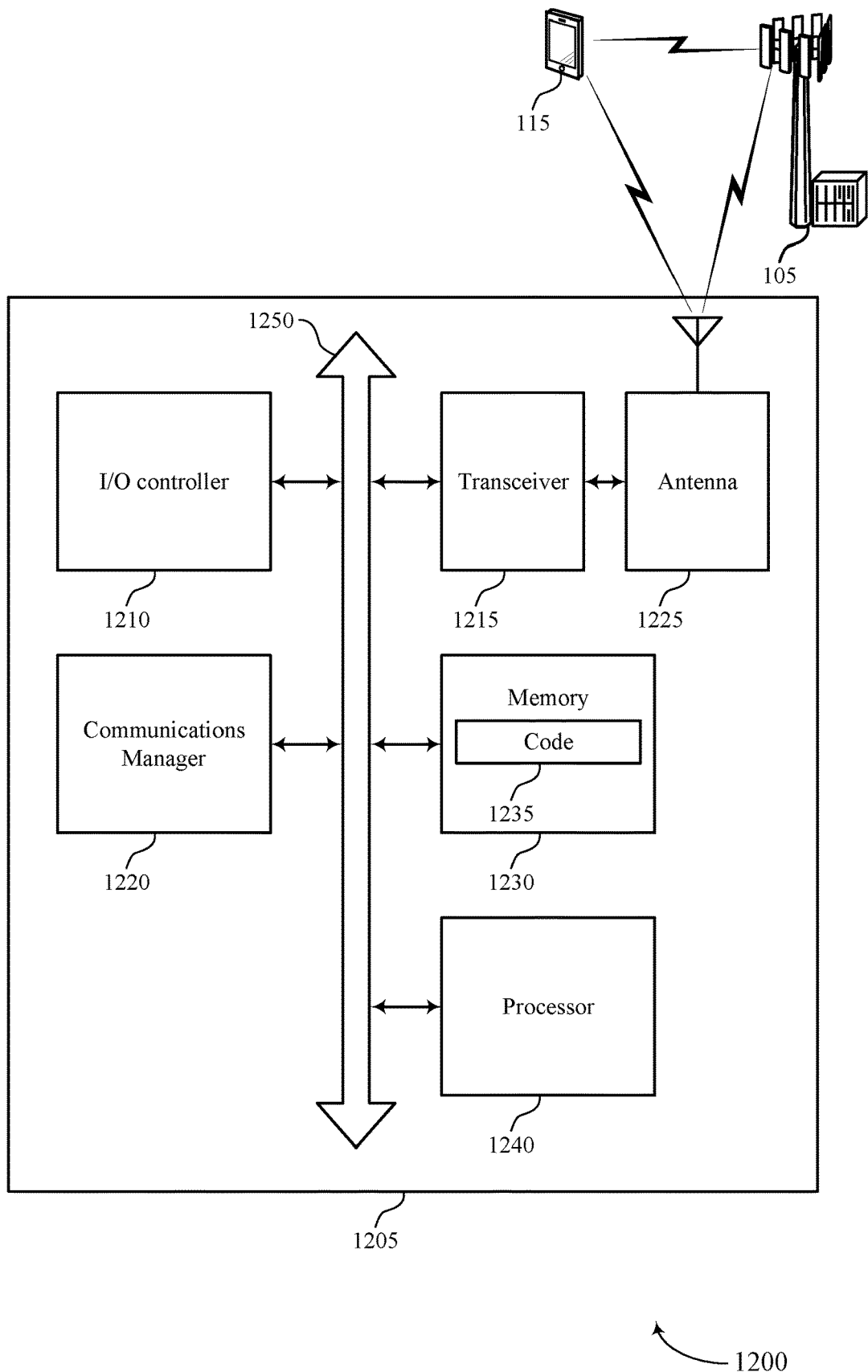
FIG. 12 shows a diagram of a system including a device that supports location accuracy signaling for movable relay nodes in accordance with aspects of the present disclosure.

FIG. 12 shows a diagram of a system 1200 including a device 1205 that supports location accuracy signaling for movable relay nodes in accordance with aspects of the present disclosure. The device 1205 may be an example of or include the components of a device 905, a device 1005, or a movable relay node as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1250).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting location accuracy signaling for movable relay nodes). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a movable relay node in accordance with examples as disclosed herein. For example, the communications manager 1220 may be configured as or otherwise support a means for establishing a connection with a control node, where the movable relay node is positioned at a first location. The communications manager 1220 may be configured as or otherwise support a means for transmitting, to the control node and based on establishing the connection, a message indicating a location variance for the movable relay node at the first location. The communications manager 1220 may be configured as or otherwise support a means for receiving, from the control node, an indication of an adjusted set of operational parameters for the movable relay node based on transmitting the message indicating the location variance for the movable relay node.

By including or configuring the communications manager 1220 in accordance with examples as described herein, the device 1205 may support techniques for improved network throughput (e.g., due to increasing a reception area of the RIS), network reliability (e.g., by the movable relay node repositioning such that location variance is reduced), latency (e.g., by altering one or more beam parameters such that a larger beam cross-section is incident on both the RIS and the receiving device), and improved communication reliability based on relaying communications between a first wireless node (e.g., a UE 115 or a base station 105) and a second wireless node (e.g., a UE 115 or a base station 105).

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of location accuracy signaling for movable relay nodes as described herein, or the processor 1240 and the memory 1230 may be otherwise configured to perform or support such operations.

Figure 13:
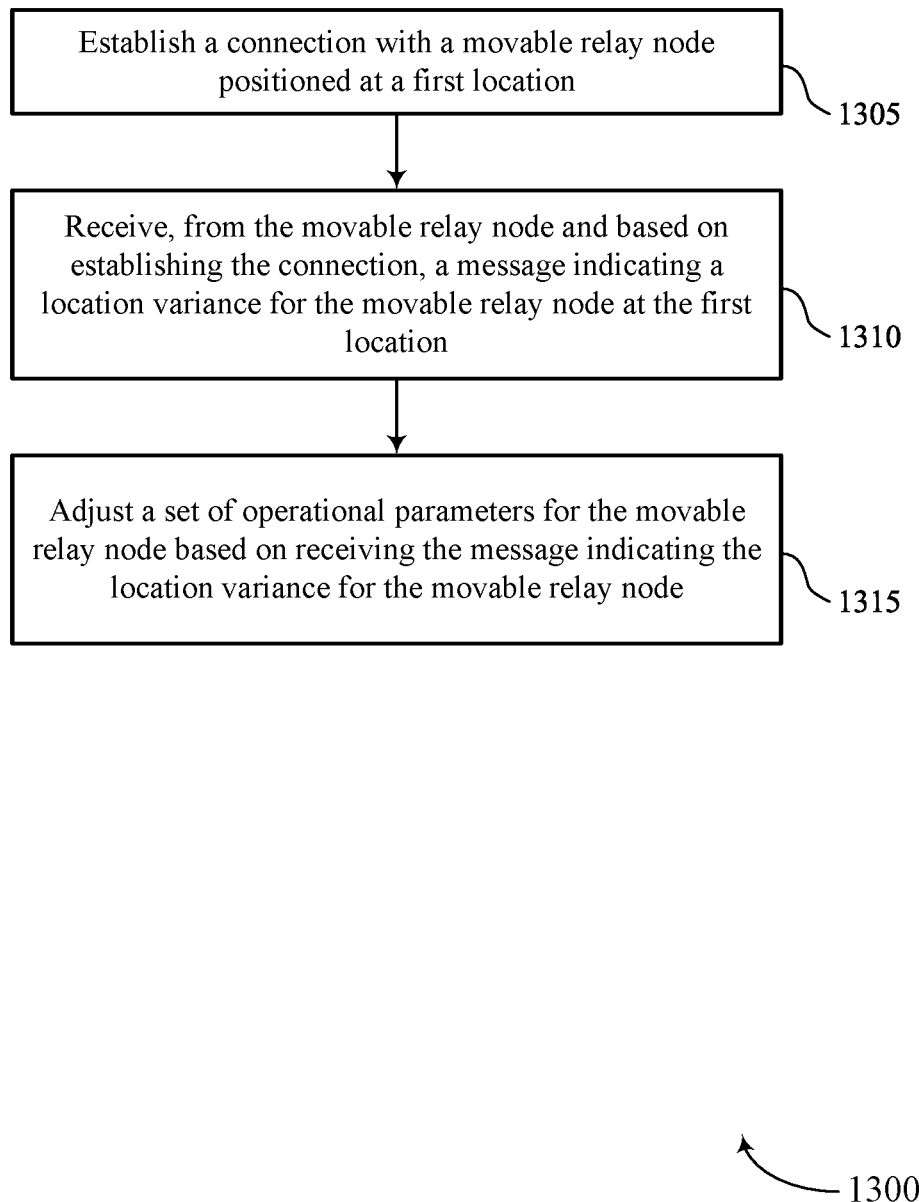
FIGS. 13 through 15 show flowcharts illustrating methods that support location accuracy signaling for movable relay nodes in accordance with aspects of the present disclosure.

FIG. 13 shows a flowchart illustrating a method 1300 that supports location accuracy signaling for movable relay nodes in accordance with aspects of the present disclosure.

The operations of the method 1300 may be implemented by a control node (e.g., a UE or a base station) or its components as described herein. For example, the operations of the method 1300 may be performed by a control node (e.g., a UE 115 or a base station 105) as described with reference to FIGS. 1 through 8. In some examples, a control node may execute a set of instructions to control the functional elements of the control node to perform the described functions. Additionally or alternatively, the control node may perform aspects of the described functions using special-purpose hardware.

At 1305, the method may include establishing a connection with a movable relay node positioned at a first location. The operations of 1305 may be performed in accordance with examples as disclosed herein. In some examples, aspects of the operations of 1305 may be performed by a connection establishment component 725 as described with reference to FIG. 7.

At 1310, the method may include receiving, from the movable relay node and based on establishing the connection, a message indicating a location variance for the movable relay node at the first location. The operations of 1310 may be performed in accordance with examples as disclosed herein. In some examples, aspects of the operations of 1310 may be performed by a location variance receiver 730 as described with reference to FIG. 7.

At 1315, the method may include adjusting a set of operational parameters for the movable relay node based on receiving the message indicating the location variance for the movable relay node. The operations of 1315 may be performed in accordance with examples as disclosed herein. In some examples, aspects of the operations of 1315 may be performed by an operational parameter adjustment component 735 as described with reference to FIG. 7.

Figure 14:
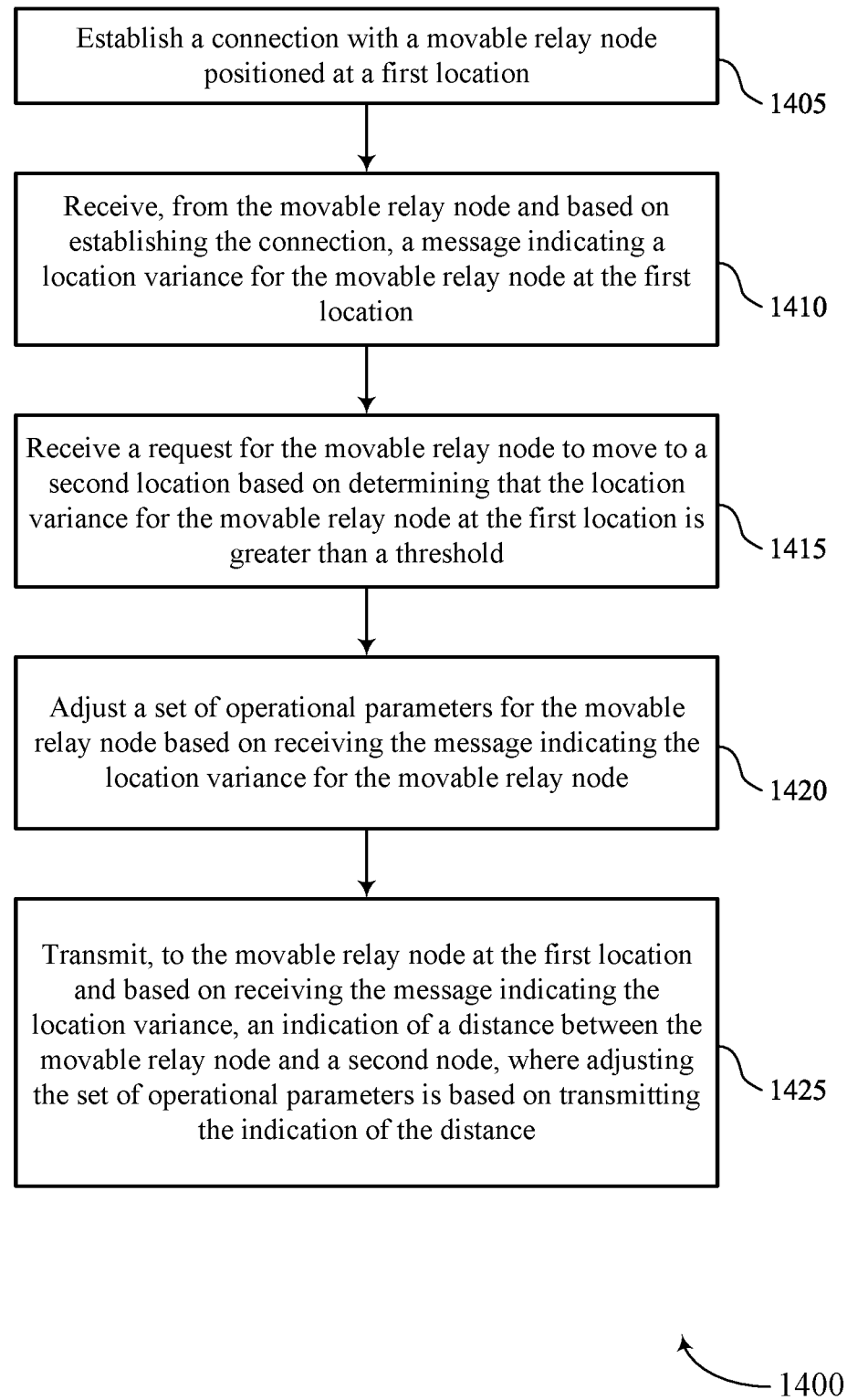

FIG. 14 shows a flowchart illustrating a method 1400 that supports location accuracy signaling for movable relay nodes in accordance with aspects of the present disclosure. The operations of the method 1400 may be implemented by a control node (e.g., a UE or a base station) or its components as described herein. For example, the operations of the method 1400 may be performed by a control node (e.g., a UE 115 or a base station 105) as described with reference to FIGS. 1 through 8. In some examples, a control node may execute a set of instructions to control the functional elements of the control node to perform the described functions. Additionally or alternatively, the control node may perform aspects of the described functions using special-purpose hardware.

At 1405, the method may include establishing a connection with a movable relay node positioned at a first location. The operations of 1405 may be performed in accordance with examples as disclosed herein. In some examples, aspects of the operations of 1405 may be performed by a connection establishment component 725 as described with reference to FIG. 7.

At 1410, the method may include receiving, from the movable relay node and based on establishing the connection, a message indicating a location variance for the movable relay node at the first location. The operations of 1410 may be performed in accordance with examples as disclosed herein. In some examples, aspects of the operations of 1410 may be performed by a location variance receiver 730 as described with reference to FIG. 7.

At 1415, the method may include receiving a request for the movable relay node to move to a second location based on determining that the location variance for the movable relay node at the first location is greater than a threshold. The operations of 1415 may be performed in accordance with examples as disclosed herein. In some examples, aspects of the operations of 1415 may be performed by a location variance receiver 730 as described with reference to FIG. 7.

At 1420, the method may include adjusting a set of operational parameters for the movable relay node based on receiving the message indicating the location variance for the movable relay node. The operations of 1420 may be performed in accordance with examples as disclosed herein. In some examples, aspects of the operations of 1420 may be performed by an operational parameter adjustment component 735 as described with reference to FIG. 7.

At 1425, the method may include transmitting, to the movable relay node at the first location and based on receiving the message indicating the location variance, an indication of a distance between the movable relay node and a second node, where adjusting the set of operational parameters is based on transmitting the indication of the distance. The operations of 1425 may be performed in accordance with examples as disclosed herein. In some examples, aspects of the operations of 1425 may be performed by an operational parameter adjustment transmitter 740 as described with reference to FIG. 7.

Figure 15:
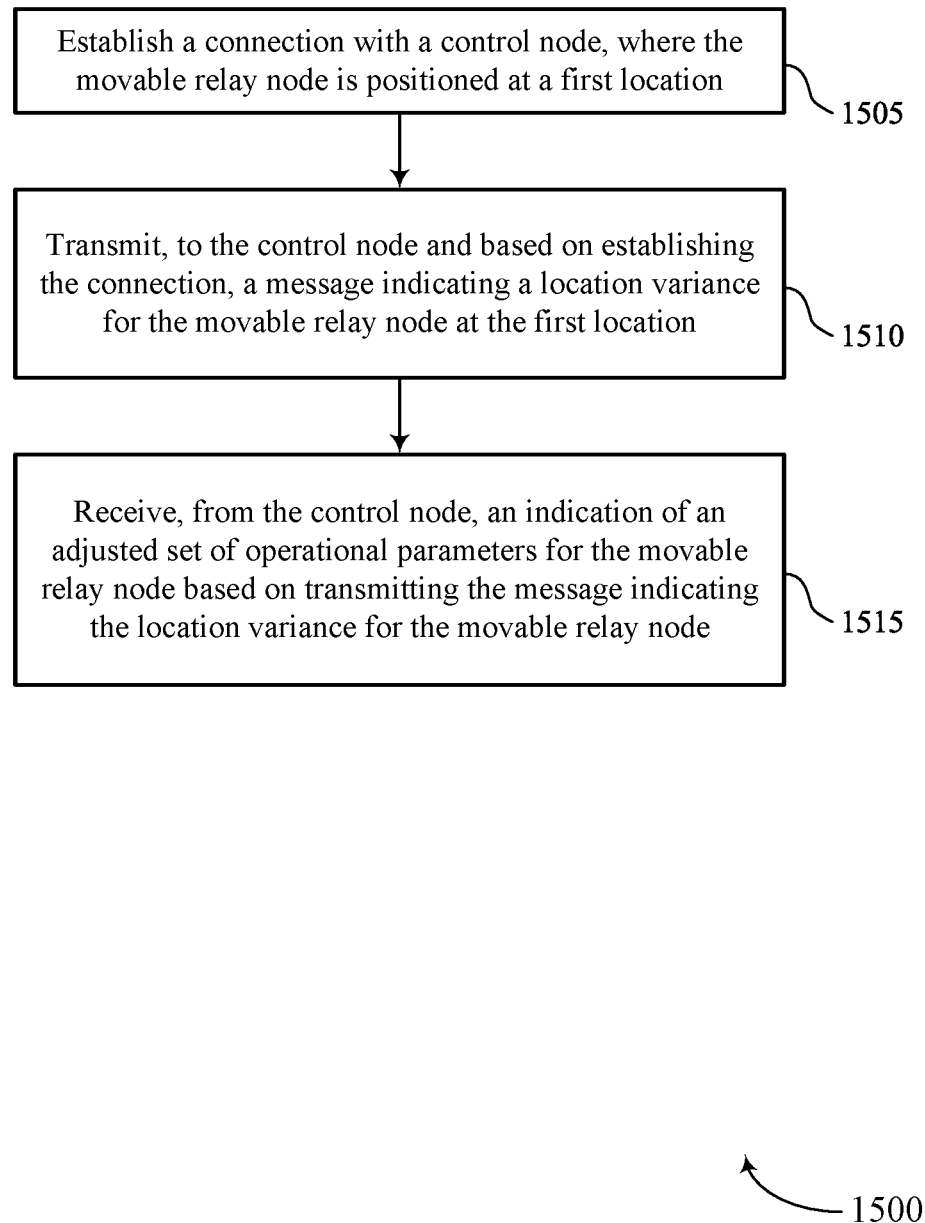

FIG. 15 shows a flowchart illustrating a method 1500 that supports location accuracy signaling for movable relay nodes in accordance with aspects of the present disclosure. The operations of the method 1500 may be implemented by a movable relay node or its components as described herein. For example, the operations of the method 1500 may be performed by a movable relay node as described with reference to FIGS. 1 through 4 and 9 through 12. In some examples, a movable relay node may execute a set of instructions to control the functional elements of the movable relay node to perform the described functions. Additionally or alternatively, the movable relay node may perform aspects of the described functions using special-purpose hardware.

At 1505, the method may include establishing a connection with a control node, where the movable relay node is positioned at a first location. The operations of 1505 may be performed in accordance with examples as disclosed herein. In some examples, aspects of the operations of 1505 may be performed by a connection establishment component 1125 as described with reference to FIG. 11.

At 1510, the method may include transmitting, to the control node and based on establishing the connection, a message indicating a location variance for the movable relay node at the first location. The operations of 1510 may be performed in accordance with examples as disclosed herein. In some examples, aspects of the operations of 1510 may be performed by a location variance transmitter 1130 as described with reference to FIG. 11.

At 1515, the method may include receiving, from the control node, an indication of an adjusted set of operational parameters for the movable relay node based on transmitting the message indicating the location variance for the movable relay node. The operations of 1515 may be performed in accordance with examples as disclosed herein. In some examples, aspects of the operations of 1515 may be performed by an operational parameter adjustment receiver 1135 as described with reference to FIG. 11.

The following provides an overview of aspects of the present disclosure:

Aspect 1: A method for wireless communications at a control node, comprising: establishing a connection with a movable relay node positioned at a first location; receiving, from the movable relay node and based at least in part on establishing the connection, a message indicating a location variance for the movable relay node at the first location; and adjusting a set of operational parameters for the movable relay node based at least in part on receiving the message indicating the location variance for the movable relay node.

Aspect 2: The method of aspect 1, wherein receiving the message further comprises: receiving a request for the movable relay node to move to a second location based at least in part on determining that the location variance for the movable relay node at the first location is greater than a threshold.

Aspect 3: The method of aspect 2, further comprising: transmitting, to the movable relay node at the first location and based at least in part on receiving the request, a location message indicating the second location for the movable relay node, wherein adjusting the set of operational parameters is based at least in part on transmitting the location message.

Aspect 4: The method of any of aspects 1 through 3, wherein receiving the message further comprises: receiving a request indicating a beam width for a beam used to communicate with the movable relay node, wherein adjusting the set of operational parameters is based at least in part on receiving the request indicating the beam width.

Aspect 5: The method of aspect 4, further comprising: transmitting, to the movable relay node at the first location and based at least in part on receiving the request of the beam width, an indication of a selected beam width for communicating with the movable relay node, wherein adjusting the set of operational parameters comprises adjusting a current beam width for the beam used to communicate with the movable relay node to the selected beam width.

Aspect 6: The method of any of aspects 1 through 5, wherein receiving the message further comprises: receiving a request for a second beam width wider than a first beam width by a factor, wherein the location variance for the movable relay node is determined based at least in part on the first beam width.

Aspect 7: The method of any of aspects 1 through 6, further comprising: transmitting, to the movable relay node at the first location and based at least in part on receiving the message indicating the location variance, an indication of a distance between the movable relay node and a second node, wherein adjusting the set of operational parameters is based at least in part on transmitting the indication of the distance.

Aspect 8: The method of aspect 7, wherein the control node comprises a UE and the second node comprises a base station.

Aspect 9: The method of any of aspects 1 through 8, further comprising: transmitting, to the movable relay node at the first location and based at least in part on receiving the message indicating the location variance, an indication of a second value associated with a reconfigurable intelligent surface plane angle for the movable relay node, wherein adjusting the set of operational parameters is based at least in part on transmitting the indication of the second value.

Aspect 10: The method of any of aspects 1 through 9, wherein receiving the message further comprises: receiving a physical downlink shared channel comprising the message indicating the location variance for the movable relay node, wherein the message comprises a radio resource control message, a medium access control (MAC) control element, or both.

Aspect 11: The method of any of aspects 1 through 10, wherein receiving the message further comprises: receiving a physical sidelink shared channel comprising the message indicating the location variance for the movable relay node.

Aspect 12: The method of any of aspects 1 through 11, wherein the message comprises a periodic message or an aperiodic message.

Aspect 13: The method of any of aspects 1 through 12, wherein the location variance is in accordance with an axis of the movable relay node, or a geographic coordinate system, or both.

Aspect 14: The method of any of aspects 1 through 13, wherein the control node comprises a UE or a base station or both.

Aspect 15: The method of any of aspects 1 through 14, wherein the control node comprises a base station and a second node comprises a UE.

Aspect 16: A method for wireless communications at a movable relay node, comprising: establishing a connection with a control node, wherein the movable relay node is positioned at a first location; transmitting, to the control node and based at least in part on establishing the connection, a message indicating a location variance for the movable relay node at the first location; and receiving, from the control node, an indication of an adjusted set of operational parameters for the movable relay node based at least in part on transmitting the message indicating the location variance for the movable relay node.

Aspect 17: The method of aspect 16, further comprising: determining that the location variance for the movable relay node at the first location is greater than a threshold, wherein transmitting the message comprises transmitting a request for the movable relay node to move to a second location based at least in part on determining that the location variance for the movable relay node at the first location is greater than the threshold.

Aspect 18: The method of aspect 17, further comprising: receiving, from the control node and based at least in part on transmitting the request, a location message indicating the second location for the movable relay node, wherein the adjusted set of operational parameters is adjusted based at least in part on the location message.

Aspect 19: The method of any of aspects 16 through 18, wherein transmitting the message further comprises: transmitting a request indicating a beam width for a beam used to communicate with the movable relay node.

Aspect 20: The method of aspect 19, further comprising: receiving, from the control node and based at least in part on transmitting the request of the beam width, an indication of a selected beam width for communicating with the movable relay node, wherein the adjusted set of operational parameters comprises adjusting a current beam width for the beam used to communicate with the movable relay node to the selected beam width.

Aspect 21: The method of any of aspects 16 through 20, further comprising: determining the location variance for the movable relay node is determined based at least in part on a first beam width, wherein transmitting the message comprises transmitting a request for a second beam width wider than the first beam width by a factor.

Aspect 22: The method of any of aspects 16 through 21, further comprising: receiving, from the control node and based at least in part on transmitting the message indicating the location variance, an indication of a distance between the movable relay node and a second node, wherein the adjusted set of operational parameters is based at least in part on the indication of the distance.

Aspect 23: The method of aspect 22, wherein the control node comprises a UE and the second node comprises a base station.

Aspect 24: The method of any of aspects 16 through 23, further comprising: receiving, from the control node and based at least in part on transmitting the message indicating the location variance, an indication of a second value associated with a reconfigurable intelligent surface plane angle for the movable relay node, wherein the adjusted set of operational parameters is based at least in part on the indication of the second value.

Aspect 25: The method of any of aspects 16 through 24, wherein transmitting the message further comprises: transmitting a physical downlink shared channel comprising the message indicating the location variance for the movable relay node, wherein the message comprises a radio resource control message, a medium access control (MAC) control element, or both.

Aspect 26: The method of any of aspects 16 through 25, wherein transmitting the message further comprises: transmitting a physical sidelink shared channel comprising the message indicating the location variance for the movable relay node.

Aspect 27: The method of any of aspects 16 through 26, wherein the location variance is in accordance with an axis of the movable relay node, or a geographic coordinate system, or both.

Aspect 28: An apparatus for wireless communications at a control node, comprising a processor; memory coupled with the processor; and instructions stored in the memory and executable by the processor to cause the apparatus to perform a method of any of aspects 1 through 15.

Aspect 29: An apparatus for wireless communications at a control node, comprising at least one means for performing a method of any of aspects 1 through 15.

Aspect 30: A non-transitory computer-readable medium storing code for wireless communications at a control node, the code comprising instructions executable by a processor to perform a method of any of aspects 1 through 15.

Aspect 31: An apparatus for wireless communications at a movable relay node, comprising a processor; memory coupled with the processor; and instructions stored in the memory and executable by the processor to cause the apparatus to perform a method of any of aspects 16 through 27.

Aspect 32: An apparatus for wireless communications at a movable relay node, comprising at least one means for performing a method of any of aspects 16 through 27.

Aspect 33: A non-transitory computer-readable medium storing code for wireless communications at a movable relay node, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a control node, comprising:
    establishing a connection with a movable relay node positioned at a first location;
    receiving, from the movable relay node and based at least in part on establishing the connection, a message indicating a location variance for the movable relay node at the first location; and
    adjusting a set of operational parameters for the movable relay node based at least in part on receiving the message indicating the location variance for the movable relay node.

2. The method of claim 1, wherein receiving the message further comprises:
    receiving a request for the movable relay node to move to a second location based at least in part on determining that the location variance for the movable relay node at the first location is greater than a threshold.

3. The method of claim 2, further comprising:
    transmitting, to the movable relay node at the first location and based at least in part on receiving the request, a location message indicating the second location for the movable relay node, wherein adjusting the set of operational parameters is based at least in part on transmitting the location message.

4. The method of claim 1, wherein receiving the message further comprises:
    receiving a request indicating a beam width for a beam used to communicate with the movable relay node, wherein adjusting the set of operational parameters is based at least in part on receiving the request indicating the beam width.

5. The method of claim 4, further comprising:
    transmitting, to the movable relay node at the first location and based at least in part on receiving the request of the beam width, an indication of a selected beam width for communicating with the movable relay node, wherein adjusting the set of operational parameters comprises adjusting a current beam width for the beam used to communicate with the movable relay node to the selected beam width.

6. The method of claim 1, wherein receiving the message further comprises:
    receiving a request for a second beam width wider than a first beam width by a factor, wherein the location variance for the movable relay node is determined based at least in part on the first beam width.

7. The method of claim 1, further comprising:
    transmitting, to the movable relay node at the first location and based at least in part on receiving the message indicating the location variance, an indication of a distance between the movable relay node and a second node, wherein adjusting the set of operational parameters is based at least in part on transmitting the indication of the distance.

8. The method of claim 7, wherein the control node comprises a user equipment (UE) and the second node comprises a base station.

9. The method of claim 1, further comprising:
    transmitting, to the movable relay node at the first location and based at least in part on receiving the message indicating the location variance, an indication of a second value associated with a reconfigurable intelligent surface plane angle for the movable relay node, wherein adjusting the set of operational parameters is based at least in part on transmitting the indication of the second value.

10. The method of claim 1, wherein receiving the message further comprises:
    receiving a physical downlink shared channel comprising the message indicating the location variance for the movable relay node, wherein the message comprises a radio resource control message, a medium access control (MAC) control element, or both.

11. The method of claim 1, wherein receiving the message further comprises:
receiving a physical sidelink shared channel comprising the message indicating the location variance for the movable relay node.

12. The method of claim 1, wherein the message comprises a periodic message or an aperiodic message.

13. The method of claim 1, wherein the location variance is in accordance with an axis of the movable relay node, or a geographic coordinate system, or both.

14. The method of claim 1, wherein the control node comprises a user equipment (UE) or a base station or both.

15. The method of claim 1, wherein the control node comprises a base station and a second node comprises a user equipment (UE).

16. A method for wireless communications at a movable relay node, comprising:
establishing a connection with a control node, wherein the movable relay node is positioned at a first location;
transmitting, to the control node and based at least in part on establishing the connection, a message indicating a location variance for the movable relay node at the first location; and
receiving, from the control node, an indication of an adjusted set of operational parameters for the movable relay node based at least in part on transmitting the message indicating the location variance for the movable relay node.

17. The method of claim 16, further comprising:
determining that the location variance for the movable relay node at the first location is greater than a threshold, wherein transmitting the message comprises transmitting a request for the movable relay node to move to a second location based at least in part on determining that the location variance for the movable relay node at the first location is greater than the threshold.

18. The method of claim 17, further comprising:
receiving, from the control node and based at least in part on transmitting the request, a location message indicating the second location for the movable relay node, wherein the adjusted set of operational parameters is adjusted based at least in part on the location message.

19. The method of claim 16, wherein transmitting the message further comprises:
transmitting a request indicating a beam width for a beam used to communicate with the movable relay node.

20. The method of claim 19, further comprising:
receiving, from the control node and based at least in part on transmitting the request of the beam width, an indication of a selected beam width for communicating with the movable relay node, wherein the adjusted set of operational parameters comprises adjusting a current beam width for the beam used to communicate with the movable relay node to the selected beam width.

21. The method of claim 16, further comprising:
determining the location variance for the movable relay node is determined based at least in part on a first beam width, wherein transmitting the message comprises transmitting a request for a second beam width wider than the first beam width by a factor.

22. The method of claim 16, further comprising:
receiving, from the control node and based at least in part on transmitting the message indicating the location variance, an indication of a distance between the movable relay node and a second node, wherein the adjusted set of operational parameters is based at least in part on the indication of the distance.

23. The method of claim 22, wherein the control node comprises a user equipment (UE) and the second node comprises a base station.

24. The method of claim 16, further comprising:
receiving, from the control node and based at least in part on transmitting the message indicating the location variance, an indication of a second value associated with a reconfigurable intelligent surface plane angle for the movable relay node, wherein the adjusted set of operational parameters is based at least in part on the indication of the second value.

25. The method of claim 16, wherein transmitting the message further comprises:
transmitting a physical downlink shared channel comprising the message indicating the location variance for the movable relay node, wherein the message comprises a radio resource control message, a medium access control (MAC) control element, or both.

26. The method of claim 16, wherein transmitting the message further comprises:
transmitting a physical sidelink shared channel comprising the message indicating the location variance for the movable relay node.

27. The method of claim 16, wherein the location variance is in accordance with an axis of the movable relay node, or a geographic coordinate system, or both.

28. An apparatus for wireless communications at a control node, comprising:
a processor;
memory coupled with the processor; and
instructions stored in the memory and executable by the processor to cause the apparatus to:
establish a connection with a movable relay node positioned at a first location;
receive, from the movable relay node and based at least in part on establishing the connection, a message indicating a location variance for the movable relay node at the first location; and
adjust a set of operational parameters for the movable relay node based at least in part on receiving the message indicating the location variance for the movable relay node.

29. The apparatus of claim 28, wherein the instructions to receive the message are further executable by the processor to cause the apparatus to:
receive a request for the movable relay node to move to a second location based at least in part on determining that the location variance for the movable relay node at the first location is greater than a threshold.

30. An apparatus for wireless communications at a movable relay node, comprising:
a processor;
memory coupled with the processor; and
instructions stored in the memory and executable by the processor to cause the apparatus to:
establish a connection with a control node, wherein the movable relay node is positioned at a first location;
transmit, to the control node and based at least in part on establishing the connection, a message indicating a location variance for the movable relay node at the first location; and
receive, from the control node, an indication of an adjusted set of operational parameters for the movable relay node based at least in part on transmitting the message indicating the location variance for the movable relay node.

* * * * *